US 8,407,842 B2

(12) United States Patent
Story et al.

(10) Patent No.: US 8,407,842 B2
(45) Date of Patent: Apr. 2, 2013

(54) DOCK LEVELERS AND ASSOCIATED SYSTEMS AND METHODS

(75) Inventors: Michael Story, Denton, TX (US); Jeff Limbaugh, Allen, TX (US); Richard K. Hoofard, Dallas, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 177 days.

(21) Appl. No.: 12/862,638

(22) Filed: Aug. 24, 2010

(65) Prior Publication Data

US 2011/0047725 A1 Mar. 3, 2011

Related U.S. Application Data

(60) Provisional application No. 61/236,770, filed on Aug. 25, 2009.

(51) Int. Cl.
*E01D 1/00* (2006.01)
(52) U.S. Cl. .......................................... 14/71.3; 14/71.1
(58) Field of Classification Search .................. 14/69.5, 14/71.1, 71.3
See application file for complete search history.

(56) References Cited

U.S. PATENT DOCUMENTS

| | | |
|---|---|---|
| 2,504,635 A | 4/1950 | Bradley |
| 3,075,234 A | 1/1963 | Speakman |
| 3,201,814 A * | 8/1965 | Le Clear .......................... 14/71.7 |
| 3,854,258 A | 12/1974 | Colado et al. |
| 4,047,258 A * | 9/1977 | Burnham ......................... 14/71.3 |
| 4,286,410 A | 9/1981 | Hahn |
| 4,293,969 A | 10/1981 | Frommelt |
| 4,422,199 A | 12/1983 | Frommelt |
| 4,557,008 A | 12/1985 | Jurden |
| 4,630,989 A * | 12/1986 | Davey ............................ 414/401 |
| 4,682,382 A | 7/1987 | Bennett |
| 4,711,059 A | 12/1987 | Layne |
| 4,744,121 A | 5/1988 | Swessel et al. |
| 4,945,606 A | 8/1990 | Eckel |
| 4,987,708 A | 1/1991 | Wilcox |

(Continued)

FOREIGN PATENT DOCUMENTS

| | | |
|---|---|---|
| AU | 2006230657 A1 | 5/2007 |
| WO | WO-9410073 A1 | 5/1994 |

(Continued)

OTHER PUBLICATIONS

International Search Report and Written Opinion for PCT/US2010/046531; Applicant: 4 Front Engineered Solutions, Inc.; Date of Mailing: Oct. 19, 2010, 9 pages.

(Continued)

*Primary Examiner* — Thomas B Will
*Assistant Examiner* — Abigail A Risic
(74) *Attorney, Agent, or Firm* — Perkins Coie LLP

(57) ABSTRACT

Dock levelers, such as mechanical dock levelers, are described herein. In one embodiment, a mechanical dock leveler includes a ramp having a lip pivotally attached to a forward edge. A ramp lifting system is configured to assist upward rotation of the ramp as it is manually raised. In this embodiment, a lip lifting system is operably coupled to the ramp lifting system so that the ramp is initially "downward biased" prior to being raised, and then becomes at least partially supported in a raised position by the lip lifting mechanism, once the lip lifting mechanism is engaged.

17 Claims, 20 Drawing Sheets

U.S. PATENT DOCUMENTS

| | | | |
|---|---|---|---|
| 5,001,799 | A | 3/1991 | Alexander et al. |
| 5,088,143 | A | 2/1992 | Alexander |
| 5,168,681 | A | 12/1992 | Ayrapetyan |
| 5,313,681 | A | 5/1994 | Alexander |
| 5,396,676 | A | 3/1995 | Alexander et al. |
| 5,442,825 | A | 8/1995 | Hahn et al. |
| 5,475,888 | A | 12/1995 | Massey |
| 5,535,561 | A | 7/1996 | Schuyler |
| 5,832,554 | A * | 11/1998 | Alexander ............... 14/71.1 |
| 6,073,402 | A | 6/2000 | Moody |
| 6,125,491 | A | 10/2000 | Alexander |
| 6,163,913 | A * | 12/2000 | DiSieno et al. ........... 14/71.3 |
| 6,195,949 | B1 | 3/2001 | Schuyler |
| 6,276,026 | B1 | 8/2001 | Wille |
| 6,311,352 | B1 * | 11/2001 | Springer ................ 14/71.5 |
| 6,408,925 | B1 | 6/2002 | Dorma |
| 6,442,783 | B1 | 9/2002 | Yoon et al. |
| 6,487,741 | B2 * | 12/2002 | Alexander ............... 14/71.3 |
| 6,502,268 | B2 | 1/2003 | Ashelin et al. |
| 6,588,482 | B2 | 7/2003 | Wright |
| 6,654,976 | B2 | 12/2003 | Digmann et al. |
| 6,769,149 | B2 * | 8/2004 | Alexander ............... 14/71.3 |
| 6,810,817 | B1 | 11/2004 | James |
| 6,948,285 | B2 | 9/2005 | Miller et al. |
| 6,983,785 | B2 | 1/2006 | Altimore |
| 7,059,379 | B2 | 6/2006 | Lewis et al. |
| 7,146,673 | B1 | 12/2006 | Digmann et al. |
| 7,162,762 | B1 | 1/2007 | Gleason et al. |
| 7,213,285 | B2 | 5/2007 | Mitchell |
| 7,216,391 | B2 | 5/2007 | Muhl et al. |
| 7,230,819 | B2 | 6/2007 | Muchow et al. |
| 7,334,281 | B2 | 2/2008 | Digmann et al. |
| 7,363,670 | B2 | 4/2008 | Mitchell et al. |
| 7,533,504 | B2 | 5/2009 | Johnson |
| 7,537,042 | B2 | 5/2009 | Altimore |
| 2002/0092102 | A1 * | 7/2002 | Lounsbury ............... 14/71.3 |
| 2004/0117927 | A1 * | 6/2004 | Gleason ................. 14/71.3 |
| 2005/0091766 | A1 * | 5/2005 | Gleason ................. 14/71.3 |
| 2005/0273949 | A1 * | 12/2005 | Gleason ................. 14/71.3 |
| 2006/0053694 | A1 | 3/2006 | Hormann et al. |
| 2007/0101517 | A1 | 5/2007 | Digmann et al. |
| 2007/0101518 | A1 | 5/2007 | Digmann et al. |
| 2008/0052843 | A1 | 3/2008 | Eungard et al. |
| 2009/0165224 | A1 | 7/2009 | Digmann et al. |
| 2010/0031457 | A1 | 2/2010 | Gleason et al. |
| 2010/0264596 | A1 | 10/2010 | Whitley et al. |
| 2011/0220304 | A1 | 9/2011 | Diaz |
| 2011/0308744 | A1 | 12/2011 | Kicher |
| 2012/0247021 | A1 | 10/2012 | Eungard et al. |

FOREIGN PATENT DOCUMENTS

| | | |
|---|---|---|
| WO | WO-2007056744 A1 | 5/2007 |
| WO | WO-2007076507 A2 | 7/2007 |
| WO | WO-2009085515 | 7/2009 |
| WO | WO-2011025793 | 3/2011 |

OTHER PUBLICATIONS

Frommelt VHLS Vertical Under-leveler Seal, Installation Instructions, Frommelt Products Corporation, Pub. No. VHLS-0003, May 2007, 16 pages.

Frommelt VHL Under-leveler Seal (Model VHLS), Architectural Specifications, 2 pages.

Frommelt VHLS Under-leveler Seal for Vertical Hydraulic Leveler, Rite-Hite Holding Corporation, 1 page [Internet accessed Aug. 28, 2007].

Non-Final Office Action, U.S. Appl. No. 12/424,379; Mailed Oct. 4, 2010, 15 pages.

* cited by examiner

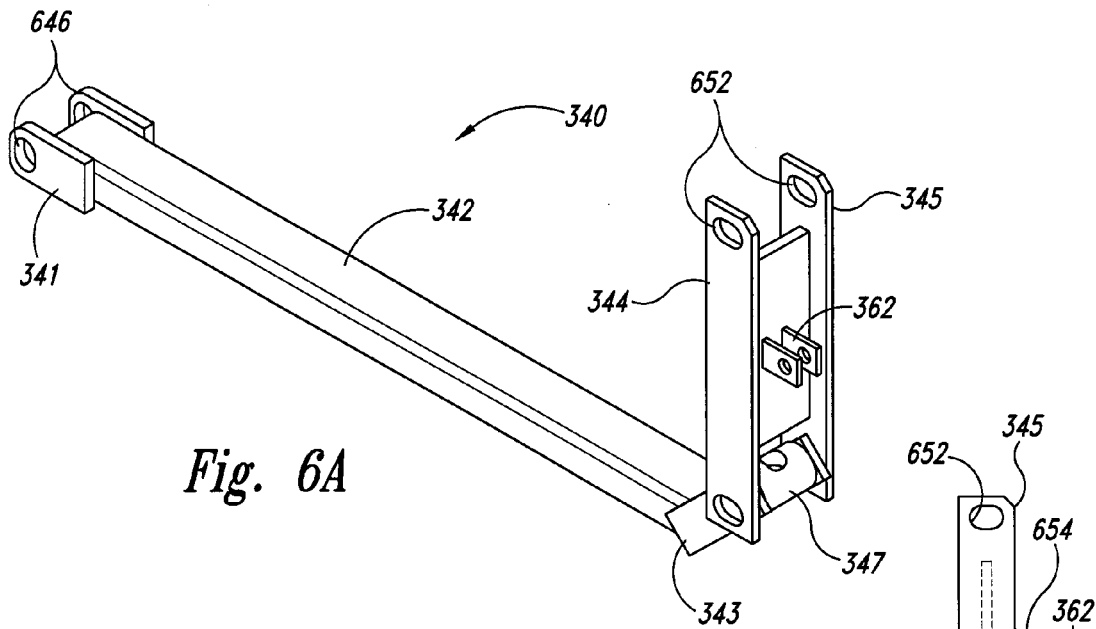
Fig. 6A
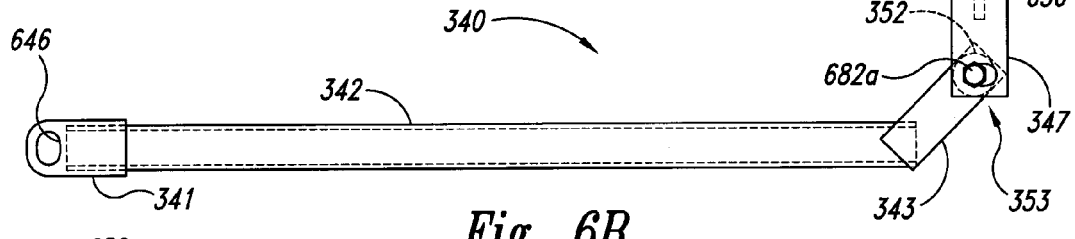
Fig. 6B
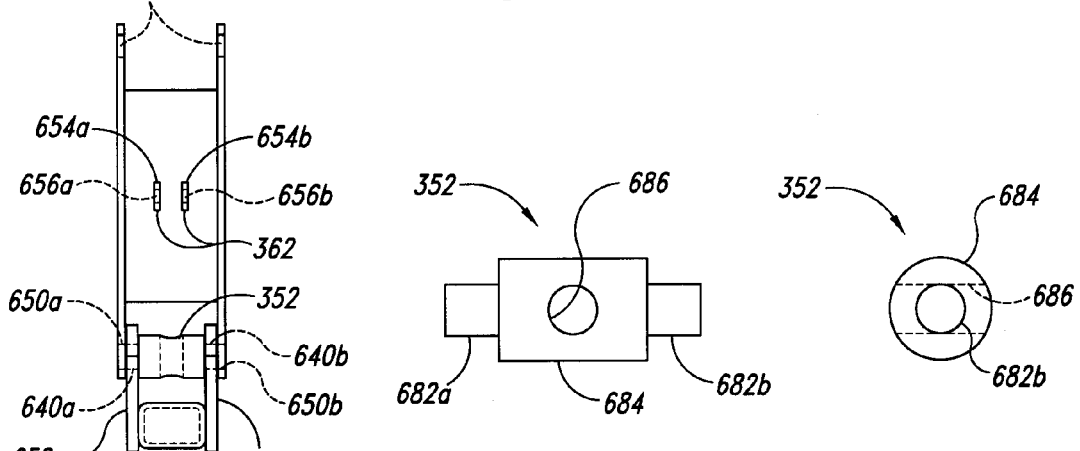
Fig. 6C
Fig. 6D
Fig. 6E

DOCK LEVELERS AND ASSOCIATED SYSTEMS AND METHODS

CROSS-REFERENCE TO RELATED APPLICATION(S) INCORPORATED BY REFERENCE

The present application claims priority to U.S. Provisional Application No. 61/236,770, filed Aug. 25, 2009, the disclosure of which is incorporated herein by reference in its entirety.

TECHNICAL FIELD

The following disclosure relates generally to dock levelers for use with loading docks.

BACKGROUND

Warehouses, manufacturing facilities, and large retail outlets typically include one or more loading docks for transferring goods to and from trucks, trailers, and other freight vehicles. Conventional loading docks usually consist of an exterior opening in a side of the building. The opening is typically covered by a roll-up door, and is usually positioned a few feet above the ground to be approximately level with trailer beds.

Some loading docks include a dock leveler that serves as movable ramp between the loading dock and the trailer bed. The aft edge of the ramp is typically attached to a hinge structure mounted to the floor of the loading dock, or to a rear wall of a dock leveler pit formed in the floor of the loading dock. The forward edge of the ramp typically carries a pivoting lip that hangs pendent until extended outwardly to set on the trailer bed. Various types of dock levelers and dock leveler features are disclosed in U.S. Pat. No. 5,475,888, U.S. Pat. No. 6,125,491 and U.S. Pat. No. 7,216,392, the disclosures of which are incorporated herein in their entireties by reference.

To load or unload goods from a trailer, the doors on the aft end of the trailer are opened and the trailer is backed up to the loading dock opening. The loading dock To load or unload goods from a trailer, the doors on the aft end of the trailer are opened and the trailer is backed up to the loading dock opening. The loading dock door is raised and the dock leveler ramp is pivoted upwardly about the rear hinge to allow the lip to be extended outwardly and then downwardly onto the trailer bed. Workers, forklifts, etc., can then move in and out of the trailer to load and/or unload cargo. The ramp can move upwardly and downwardly about the rear hinge as necessary to accommodate movement of the trailer bed during the loading/unloading process.

There are various types of dock levelers. Powered dock levelers, for example, typically use hydraulic, pneumatic, and/or electric power, etc., to raise and lower the ramp into position for use. Mechanical dock levelers, however, typically require at least some physical effort on the part of the user to raise and/or lower the ramp. "Downward biased" mechanical dock levelers, for example, typically require the user to physically raise the ramp from the stored position for use. However, the ramp can descend through at least a portion of its downward motion under its own weight. "Upward biased" mechanical dock levelers can rise by themselves with the use of springs or some other type of stored energy when released from the lower, stored position. To extend the lip on some upward biased levelers, the user "walks down" the raised ramp using his or her weight to rotate the ramp downwardly and engage a lip lifting mechanism that pivots the lip outward as the ramp descends. Because the dock leveler is upwardly biased, a hold down mechanism is usually required to keep the ramp in the lowered position during use and when stored.

The hold down mechanisms typically used with conventional upwardly biased mechanical dock levelers often require frequent maintenance and adjustment to operate properly. Accordingly, one benefit of downwardly biased dock levelers is that they do not require a lock or hold down to keep them in the lowered position.

BRIEF DESCRIPTION OF THE DRAWINGS

FIG. 6A is an isometric view of a dock leveler lift arm assembly configured in accordance with an embodiment of the disclosure, FIGS. 6B and 6C are enlarged side and front views, respectively, of the lift arm assembly of FIG. 6A, and FIGS. 6D and 6E are enlarged front and side views, respectively, of a pivot pin configured in accordance with an embodiment of the disclosure.

DETAILED DESCRIPTION

The following disclosure describes various embodiments of dock levelers and associated counter-balancing and lip lifting mechanisms. Certain details are set forth in the following description and in FIGS. 1-11 to provide a thorough understanding of various embodiments of the disclosure.

Other details describing well-known structures and systems often associated with dock levelers and loading docks in general, however, have not been set forth in the following disclosure to avoid unnecessarily obscuring the description of the various embodiments of the invention.

The present disclosure describes various embodiments of dock levelers, such as mechanical dock levelers, that are initially "downward biased" prior to being raised, and then become at least partially supported in a raised position by a lip lifting mechanism, once the lip lifting mechanism is engaged. In these embodiments, the operator "walks down" the dock leveler ramp after the lip lifting mechanism is engaged, causing the lip to rotate outwardly toward the extended position as the ramp rotates downward under the weight of the operator. In one embodiment, the lip lifting mechanism disengages once the lip is fully extended. The associated loss of the counterbalancing effect caused by the engaged lip lifting mechanism causes the ramp to assume a downward bias and return toward the floor under its own weight. Moreover, the weight of the dock leveler is sufficient to keep the dock leveler in the lower position during use without any additional and potentially problematic hold down mechanism. These and other aspects of the present disclosure are described in more detail below with reference to FIGS. 1-11.

Many of the details, dimensions, angles and/or other features shown in the Figures are merely illustrative of particular embodiments of the disclosure. Accordingly, other embodiments can have other details, dimensions, angles and features without departing from the spirit or scope of the present disclosure. Moreover, those of ordinary skill in the art will appreciate that further embodiments of the disclosure can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
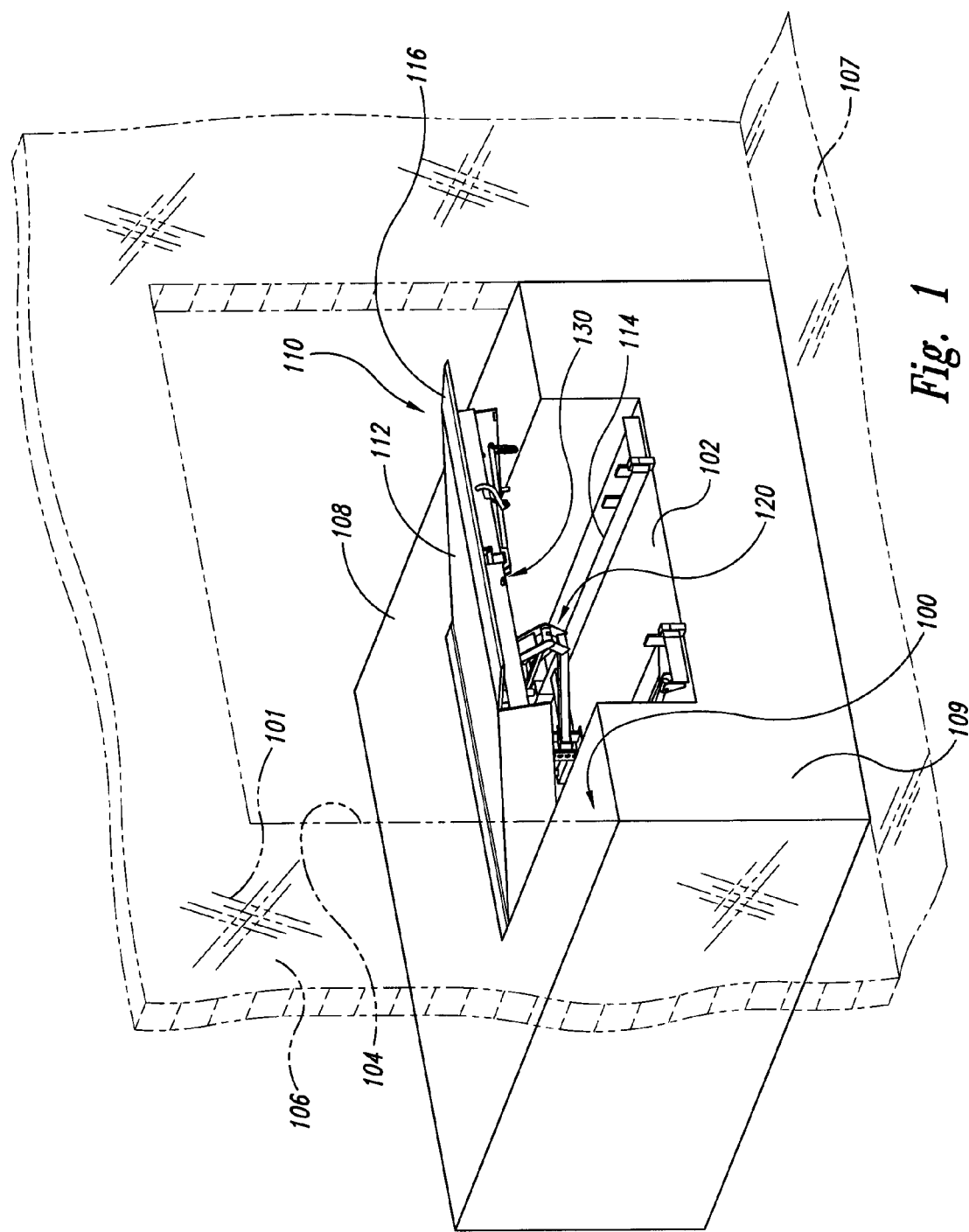
FIG. 1 is a partially cutaway isometric view of a loading dock having a dock leveler configured in accordance with an embodiment of the disclosure.

FIG. 1 is a partially cutaway isometric view of a loading dock 100 having a dock leveler 110 configured in accordance with an embodiment of the disclosure. In the illustrated embodiment, the loading dock 100 includes an opening 104 formed in an exterior wall 106 of a warehouse or other building 101. The opening 104 can be at least generally similar in size and shape to a conventional trailer truck opening having, for example, a width of about eight feet and a height of about nine feet. In other embodiments, however, the opening 104 can have other sizes, shapes and/or dimensions depending on the type of vehicle or vehicles the loading dock is designed to accommodate as well as other factors.

Although not shown in FIG. 1, the opening 104 can be temporarily closed with various types of doors known in the art. Such doors can include, for example, suitable overhead doors, sliding doors, etc. The loading dock 101 can also include bumpers (e.g., rubber bumpers; also not shown) attached to a dock face 109 proximate to the lower corners of the opening 104. Such bumpers can be used to absorb the impact from shipping trailers and other vehicles as they back into the loading dock 100. In the illustrated embodiment, the opening 104 can be positioned at a height of from about 46 inches to about 56 inches above a driveway 107, and the driveway 107 can have a grade between about ±4%. The building wall 106 can be in line with the dock face 109, as shown in FIG. 1, or it may be set back from the plane of the dock face 109. As those of ordinary skill in the art will appreciate, the foregoing characteristics of the loading dock 100 are merely representative of some of the settings in which the dock levelers described in detail herein can be installed and used. Accordingly, the dock levelers described herein can be suitably employed in a wide variety of loading dock configurations without departing from the spirit or scope of the present disclosure.

In one aspect of this embodiment, the dock leveler 110 includes a movable ramp 112 operably coupled to a support structure 114. In the illustrated embodiment, the support structure 114 is fixedly attached to the floor and back wall of a dock leveler pit 102 formed in a floor 108 of the building 101. In another aspect of this embodiment, the dock leveler 110 further includes a counterbalance system 120 and a lip lifting system 130 operably coupled to the underside of the ramp 112. As described in greater detail below, the ramp 112 can be manually raised with assistance from the counterbalance system 120 to a height where the lip lifting system 130 engages a lip 116. As the user "walks down" the ramp 112 from this position, the lip lifting system 130 causes the lip 116 to rotate outwardly before coming to rest on a trailer bed (not shown) or other transport vehicle parked in front of the opening 104.

Figure 2A:
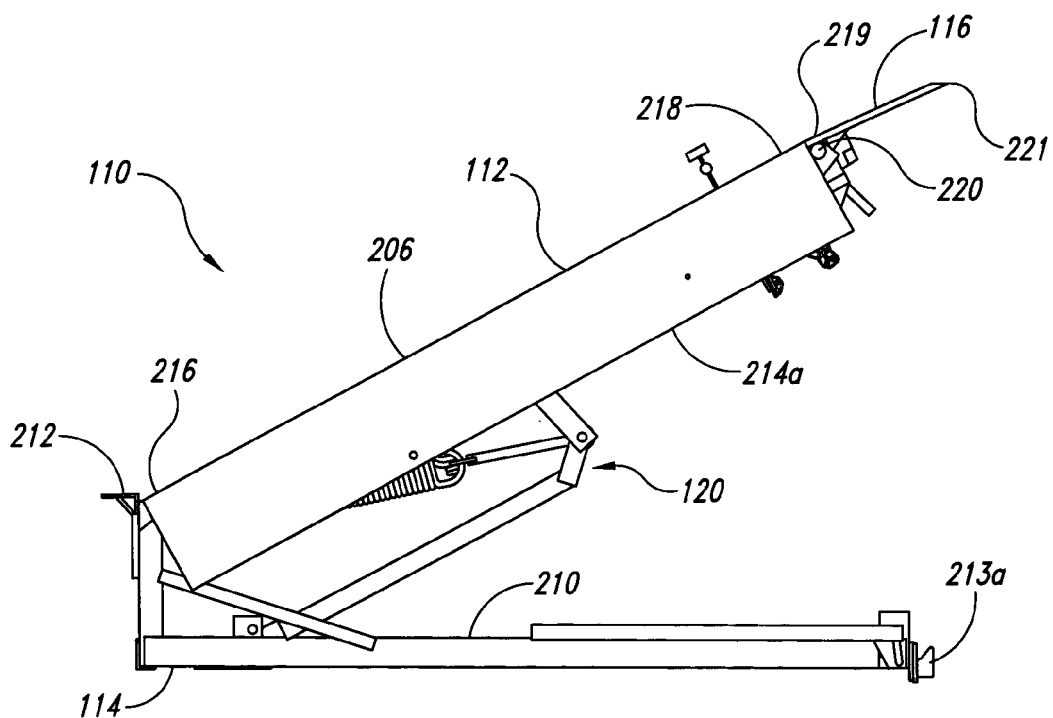
FIGS. 2A-2C are side, front and top views, respectively, of the dock leveler of FIG. 1.
Figure 2B:
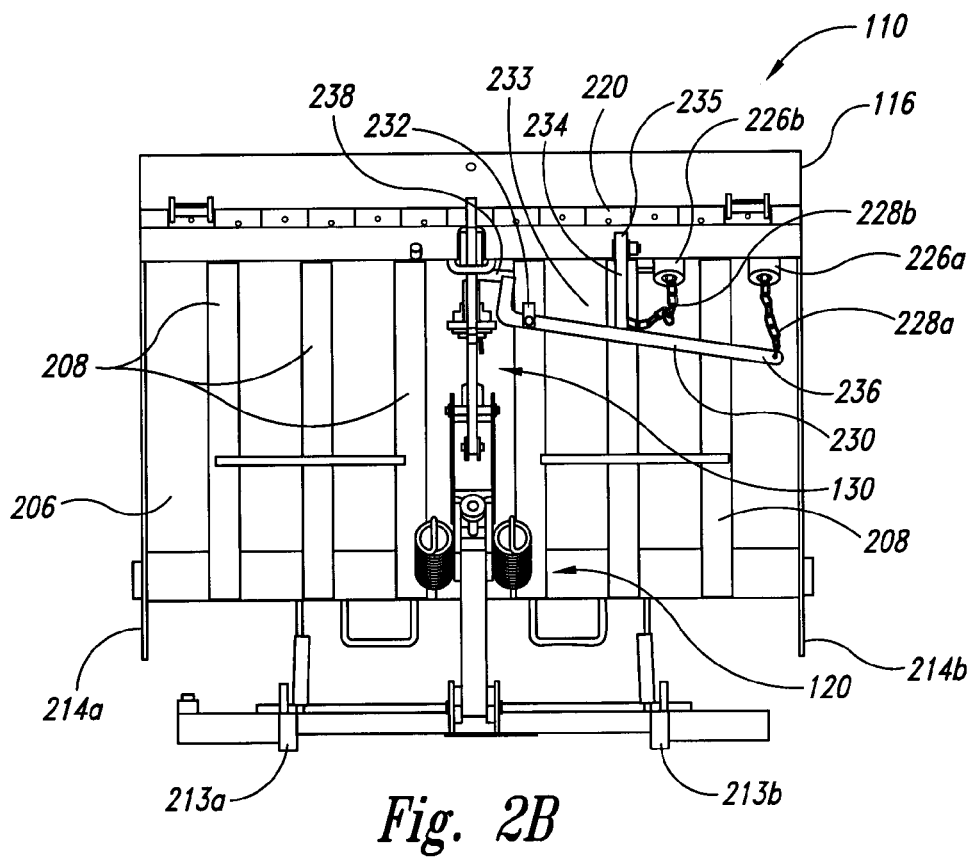
Figure 2C:
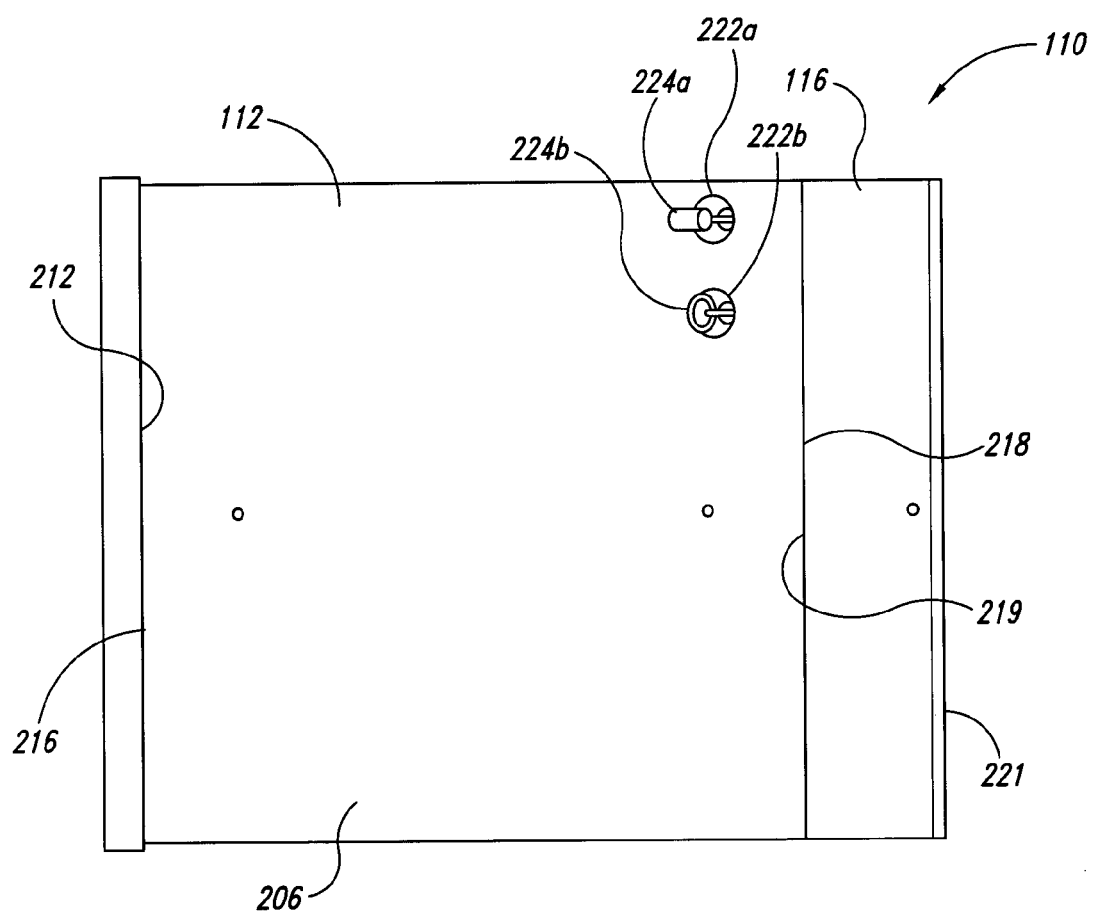

FIGS. 2A-2C are side, front and top views, respectively, of the dock leveler 110 of FIG. 1. Referring to FIGS. 2A-2C together, in the illustrated embodiment the support structure 114 includes a base frame 210 configured to be fixedly attached to the floor of the dock leveler pit 102 (FIG. 1), and a rear frame 212 configured to be fixedly attached to the aft wall of the dock leveler pit 102. The ramp 112 is comprised of a deck 206 supported by a plurality of longitudinal beams 208. The ramp 112 includes an aft edge portion 216 hingeably attached to an upper portion of the rear frame 212 using hinges and/or other suitable means known in the art. The lip 116 includes an aft edge portion 219 pivotally attached to a forward edge portion 218 of the ramp 112 by means of one or more hinges 220. In the illustrated embodiment, the ramp 112 further includes side members 214 (identified individually as a first side member 214a and a second side member 214b) extending downwardly from the side edge portions of the deck 206. The side members 214 can serve as toe guards.

Referring to FIG. 2C, the deck 206 includes a first aperture 222a and a second aperture 222b positioned toward one side of the forward edge portion 218. As shown in FIG. 2B, a first cup 226a and a second cup 226b are fixedly attached to the underside of the deck 206 beneath the apertures 222a and 222b, respectively. Each of the cups 226 also includes an aperture through which a corresponding pull chain 228 (identified individually as a first pull chain 228a and a second pull chain 228b) movably extends. The free end of each chain 228 is attached to a corresponding lift handle 224 (identified individually as a first lift handle 224a and a second lift handle 224b). More particularly, in the illustrated embodiment the first lift handle 224a is a "T" handle that is operably coupled to a first end portion 236 of a trip arm 230 by means of the first chain 228a. The second handle 224b of the illustrated embodiment is a circular ring operably coupled to a first end portion 233 of a lip extension arm 234 by means of the second chain 228b. The lift handles 224a, b reside below the surface of the deck 206 in their respective cups 226a, b when not in use. In other embodiments, the lift handles 224 can have other shapes and sizes. Similarly, in other embodiments one or both of the chains 228 can be replaced by other types of suitable structures for pulling, such as various types of cables, ropes, chords, tethers, etc., as well as other rigid or semi-rigid devices for pulling or otherwise actuating the trip arm 230 and/or the lip extension arm 234 can be used in place of the chains 228.

As described in greater detail below, an operator can pull upwardly on the first handle 224a to rotate the first end portion 236 of the trip arm 230 upwardly and raise the ramp 112. This action will simultaneously cause a second end portion 238 of the trip arm 230 to move downwardly and disengage the lip lifting system 130 if the lip 116 is extended as shown in FIGS. 2A-2C. As further described in detail below, the operator can also pull upwardly on the second handle 224b to rotate a second end portion 235 of the lip extension arm 234 outwardly toward the lip 116. If the lip 116 is hanging pendent, this action will drive the second end portion 235 against the underside of the lip 116, causing a forward edge portion 221 of the lip 116 to rotate outwardly and away from lip keepers 213 (identified individually as a first lip keeper 213a and a second lip keeper 213b).

Figure 3A:
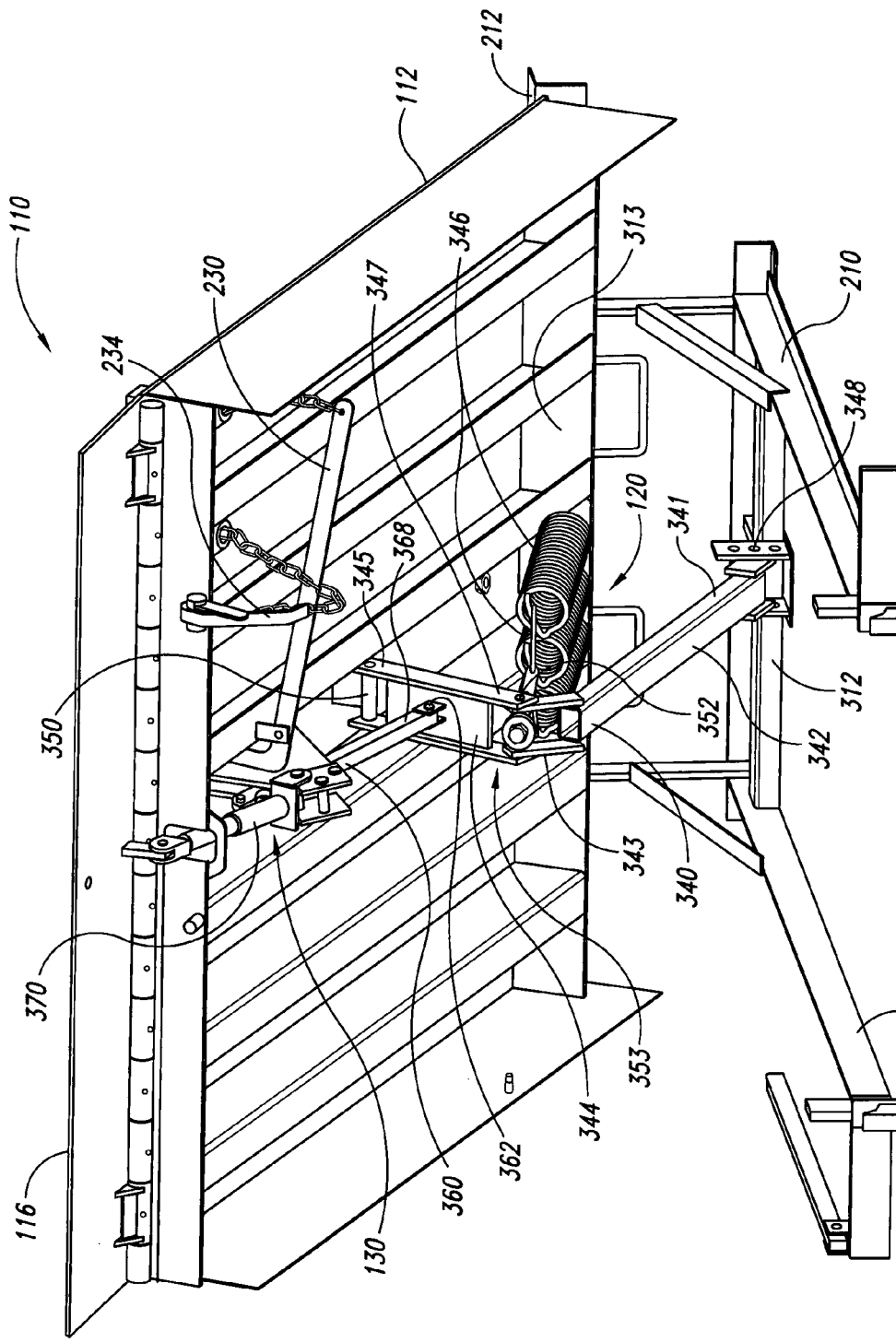
FIG. 3A is an enlarged front isometric view of the dock leveler of FIGS. 1-2C illustrating various aspects of a counterbalance system and a lip lifting system configured in accordance with embodiments of the disclosure.
Figure 3B:
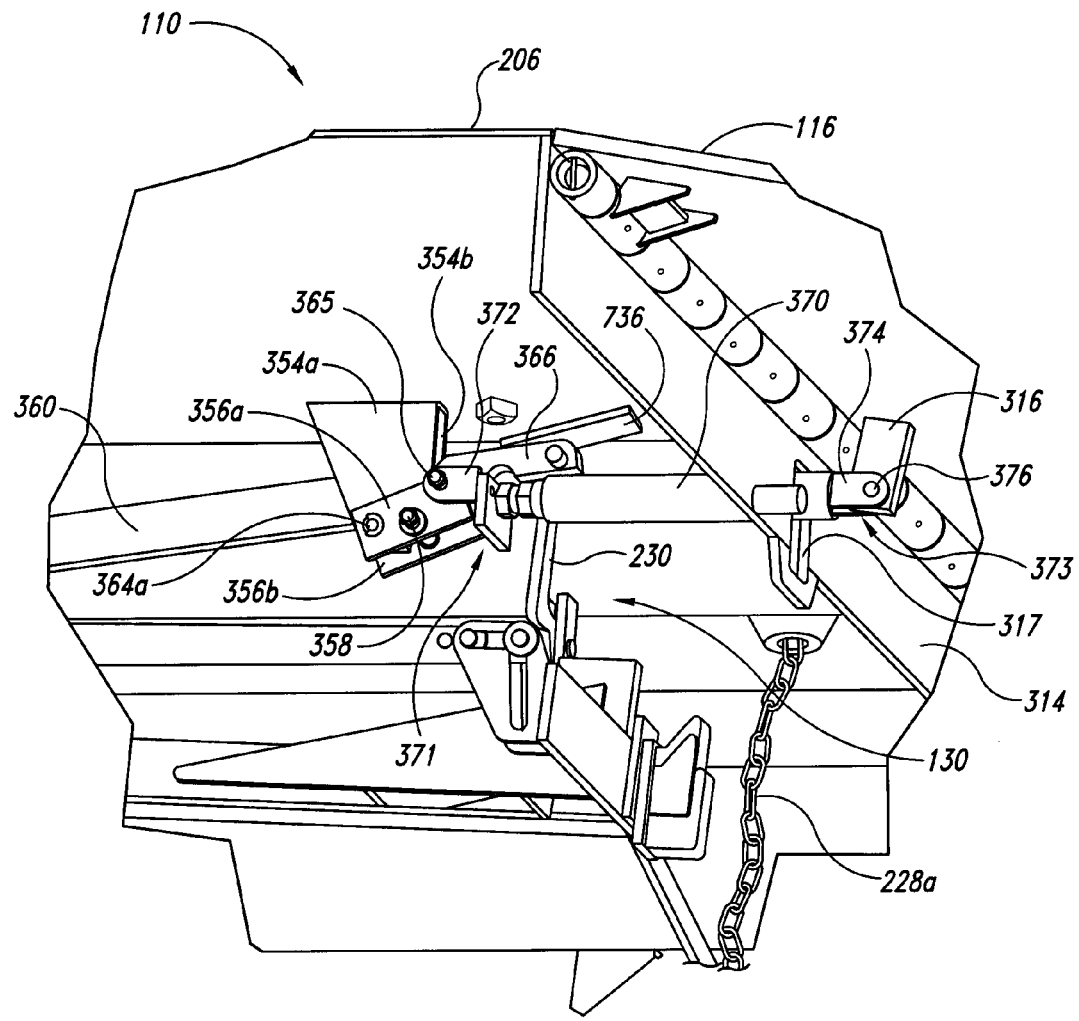
FIG. 3B is an enlarged side isometric view illustrating various aspects of these systems.

FIG. 3A is an isometric front view of the dock leveler 110, and FIG. 3B is an enlarged isometric view of a portion of the underside of the dock leveler 110 illustrating various features associated with the lip lifting system 130 in more detail. Referring first to FIG. 3A, the counterbalance system 120 includes an articulating lift arm assembly 340. In the illustrated embodiment, the lift arm assembly 340 includes a lower link 342 operably coupled to an upper link 344. A first end portion 341 of the lower link 342 is pivotally coupled to a cross member 312 of the base frame 210 by means of an aft pivot bracket 348. A first end portion 345 of the upper link 344 is pivotally coupled to the underside of the ramp 112 by means of an upper pivot bracket 350. A second end portion 347 of the upper link 344 is pivotally coupled to a second end portion 343 of the lower link 342 by means of a pivot pin 352 that forms an articulating joint 353 between the upper link 344 and the lower link 342 that extends as the ramp 112 moves up and contracts as the ramp 112 moves down.

One or more biasing members 346 can be operably coupled between the pivot pin 352 and an aft edge member 313 extending across an aft edge portion of the ramp 112. In the illustrated embodiment, the biasing members 346 include a plurality of (e.g., three) coil springs that are stretched to provide a tension load that pulls or biases the joint 353 toward the aft edge member 313. As described in greater detail below, this biasing force counterbalances the weight of the ramp 112 and reduces the force required to lift the ramp 112 and the downward speed of the ramp as it descends toward the lower position.

In the illustrated embodiment, the lip lifting system 130 includes a push bar 360 having a first end portion 368 pivotally coupled to a pivot bracket 362 on the upper link 344 of the lift arm assembly 340. As described in greater detail below, the push bar 360 is configured to cooperate with a connecting rod 370 to extend the lip 116 as the ramp 112 moves downwardly toward the lower position. Further details of the lip lifting system 130 are discussed below with reference to FIG. 3B.

As shown in FIG. 3B, the lip lifting system 130 further includes first and second pivot links 356a and 356b positioned on opposite sides of a first bracket 354a and a second bracket 354b. The first and second brackets 354 extend downwardly from the underside of the deck 206, and are spaced apart from each other to accommodate passage of the push bar 360. In the illustrated embodiment, a proximal end portion of the first pivot link 356a is pivotally attached to the first bracket 354a by a first pivot pin 364a that extends outwardly from the side of the first bracket 354a, and a proximal end portion of the second pivot link 356b is pivotally attached to the second bracket 354b by a second pivot pin 364b that extends outwardly from the opposite side of the second bracket 354b (only the first pivot pin 364a can be seen in FIG. 3B). The pivot pins 364 can be welded or otherwise secured to the brackets 354; however, in the illustrated embodiment the pivot pins 364 do not extend inboard across the space between the brackets 354.

The connecting rod 370 operably extends through an aperture 317 formed in a header plate 314 that extends downwardly from the underside of the deck 206. A first end fitting 372 (e.g., a first clevis fitting) is fixedly attached to a first end portion 371 of the connecting rod 370, and a second end fitting 374 (e.g., a second clevis fitting) is fixedly attached to a second end portion 373 of the connecting rod 370. The first end fitting 372 is pivotally attached to the distal end portions of the pivot links 356 by a pivot pin 365 that extends through both pivot links 356. The second end fitting 374 is pivotally attached to a lug 316 by a pivot pin 376. In the illustrated embodiment, the lug 316 is welded or otherwise fixedly attached to the underside of the lip 116.

A second end portion 366 of the push bar 360 movably extends between the brackets 354. As described in greater detail below, the second end portion 366 of the push bar 360 is configured to operably engage a latch pin 358 extending between the pivot links 356 and drive the pivot links 356 forward. As the pivot links 356 rotate forward, the connecting rod 370 pushes the lip 116 outward toward the extended position. In the illustrated embodiment, the push bar 360 and other features of the lip lifting system 130 described above can be at least generally similar in structure and function to the lip lifting system described in detail in U.S. Pat. No. 5,475,888, which is incorporated herein in its entirety by reference. For example, in the illustrated embodiment the pivot axis defined by the latch pin 358 can be offset from a line extending through the pivot axes defined by the pivot pins 364 and the pivot pin 365. As explained in U.S. Pat. No. 5,475,888, in one embodiment this offset can create a mechanical advantage that facilitates rotating the pivot links 356 to an "over center" toggle position in which the second pivot pin 365 bears against forward edge portions of the brackets 354 and holds the lip 116 in the extended position. These and other aspects of the lip lifting system 130 are described in greater detail below.

As those of ordinary skill in the art will appreciate, most of the dock leveler components described above can be made from suitable types of metal materials that are welded or otherwise joined together using suitable techniques well established in the art for cost-effectively manufacturing dock levelers and similar structures. For example, in various embodiments the ramp 112, the support structure 114, and/or other components of the dock leveler 110 can be made from mild or carbon steel (e.g., ASTM A36, A36M, A53, etc.) plates, bars, tubes, angles, beams, etc. which are cut or otherwise formed to shape and welded, riveted, or bolted together. Pivot pins, shoulder bolts, and/or other fasteners and joining members used herein can also be made from suitable steels, such as carbon steels, alloy steels, stainless steels, etc. In other embodiments, other materials (e.g., aluminum) and/or methods can be used to manufacture and/or assemble the dock levelers described herein without departing from the spirit or scope of the present disclosure.

Figure 4A:
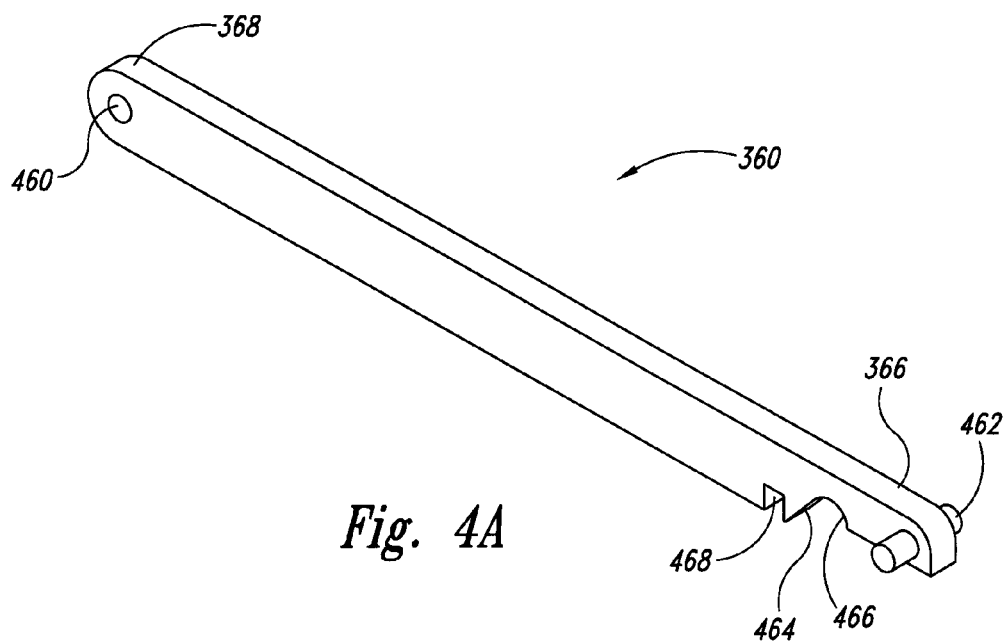
FIG. 4A is an isometric view of a push bar for use with a lip lifting system configured in accordance with an embodiment of the disclosure.
Figure 4B:
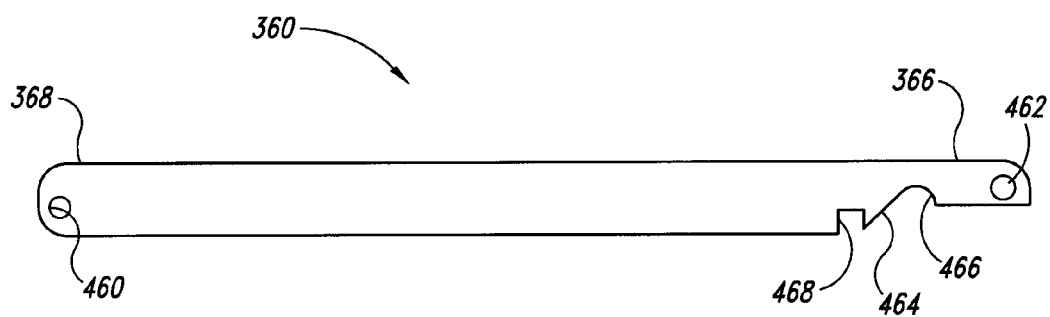
FIG. 4B is an enlarged side view of the push bar of FIG. 4A.

FIG. 4A is an isometric view of the push bar 360 configured in accordance with an embodiment of the disclosure, and FIG. 4B is an enlarged side view of the push bar 360. Referring to FIGS. 4A and 4B together, in the illustrated embodiment the push bar 360 is an elongate rigid member formed from a suitable metal such as mild steel. Although a number of dimensions are shown in FIG. 4B, these dimensions are only representative of some embodiments of push bars configured in accordance with the present disclosure. Accordingly, other embodiments can have other dimensions.

In the illustrated embodiment, the push bar 360 includes an aperture 460 formed in the first end portion 368, and a stop member or stop pin or stop member 462 extending outwardly from both sides of the second end portion 366. A shoulder bolt or other suitable fastener member (not shown) can extend through the aperture 460 to pivotally couple the first end portion 368 to the upper link 344 of the lift arm assembly 340 (FIG. 3A). The stop member 462 is configured to bear against forward edge portions of the brackets 354 (FIG. 3B) and prevent the ramp 112 from over rotating as it moves upwardly away from the lowered position.

In another aspect of this embodiment, the second end portion 366 further includes a cutout or relief 466 adjacent to an angled surface 464. A notch 468 (e.g., a rectangular notch) is formed in the push bar 360 just aft of the angled surface 464. As described in greater detail below, the notch 468 is configured to operably receive the latch pin 358 (FIG. 3B) during operation of the lip lifting system 130 and drive the pivot links 356 forward. As the pivot links 356 move forward and then up into the over-center "locked" position, the pivot pin 365 (FIG. 3B) strikes the angled surface 464 and dislodges the notch 468 from the latch pin 358. This enables the second end portion 366 of the push bar 360 to continue moving forward over the connecting rod 370 as the dock ramp 112 continues to descend from the raised position with the lip 116 extended.

Figure 5A:
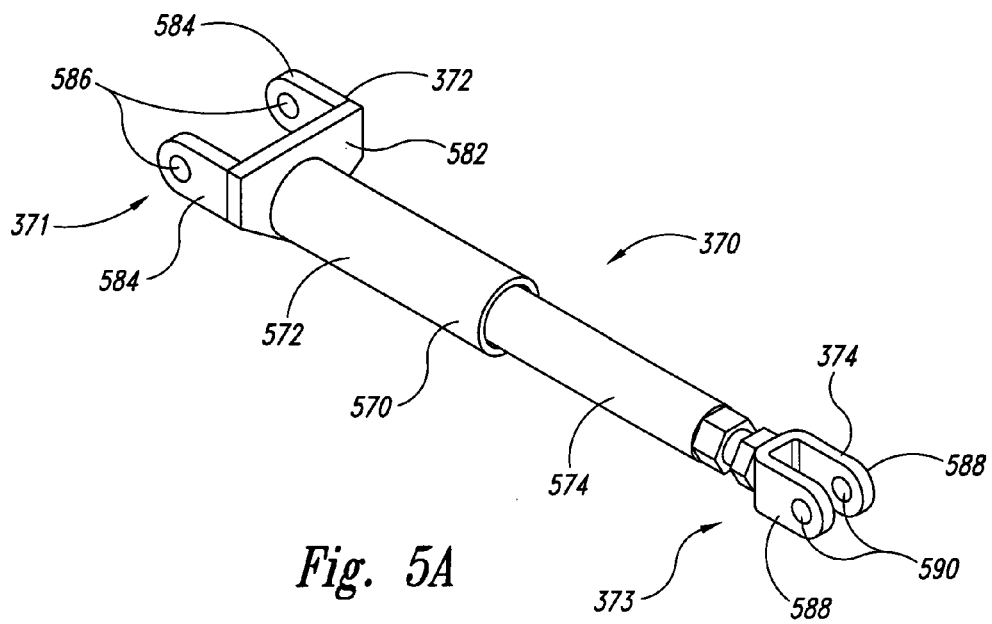
FIG. 5A is an isometric view of a connecting rod for use with a lip lifting system configured in accordance with an embodiment of the disclosure.
Figure 5B:
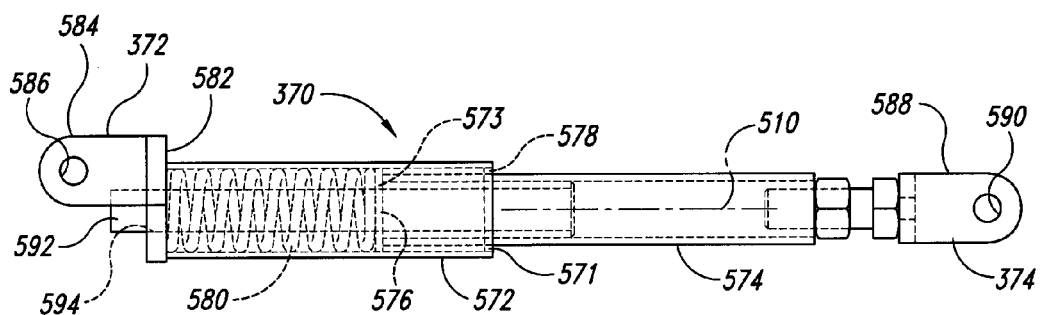
FIGS. 5B and 5C are enlarged side and top views, respectively, of the connecting rod of FIG. 5A.
Figure 5C:
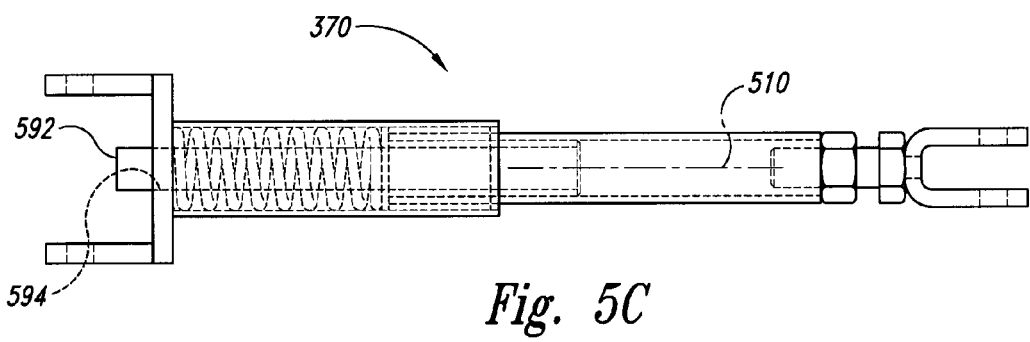

FIG. 5A is an isometric view of the connecting rod 370 configured in accordance with an embodiment of the disclosure, and FIGS. 5B and 5C are partially hidden enlarged side and top views, respectively, of the connecting rod 370. Referring to FIGS. 5A-5C together, in the illustrated embodiment the connecting rod 370 is a spring-loaded compressible member comprising a body 570 having a first cylindrical tube 572 that coaxially receives a smaller diameter second cylindrical tube 574 in telescoping fashion. The first and second tubes 572 and 574 can be made from suitable steel, such as ASTM A53. In other embodiments, other suitable materials can be used. A first annular flange 578 having an inner diameter that is just slightly greater than the outer diameter of the second tube 574 can be welded or otherwise fixed to a first end portion 571 of the first tube 572. A second annular flange 576 having an outside diameter that is just slightly less than the inner diameter of the first tube 572 can be welded or otherwise fixed to a second end portion 573 of the second tube 574. The first annular flange 578 cooperates with the second annular flange 576 to allow the second tube 574 to slide in and out of the first tube 572 along a longitudinal axis 510 during use.

In the illustrated embodiment, a biasing member 580 (e.g., a coil spring) is compressed inside the first tube 572 between the second annular flange 576 and a base plate 582 of the first end fitting 371. The biasing member can be wound from a suitable material, such as chrome-silicon wire or rod, and can have a free length of, e.g., about 4.0 inches, a solid height of about 2.8 inches, and a spring rate of about 900 lb/in. In other embodiments, the biasing member can be made from other suitable materials known in the art and can have other shapes, sizes, and/or characteristics.

A cylindrical guide rod 592 is fixedly attached to the second end portion 573 of the second tube 574, and movably extends through the center of the biasing member 580 and an aperture 594 in the base plate 582. Accordingly, when a sufficient compression force is applied to the opposite ends of the connecting rod 370, the second tube 574 slides into the first tube 572 along the longitudinal axis 510 and compresses the biasing member 580. Upon relieving the compressive force, the biasing member 580 drives the tubes outwardly to expand the connecting rod 370 along the longitudinal axis 510. However, the first flange 578 cooperates with the second flange 576 to prevent the tubes from inadvertently over-expanding and coming apart.

In the illustrated embodiment, the first end fitting 372 is a clevis fitting that includes a pair of opposing lugs 584 welded or otherwise attached to the base plate 582, which in turn can be welded or otherwise attached to the end of the first tube 572. Each lug 584 includes a corresponding aperture 586 configured to receive the pivot pin 365 (FIG. 3B) and pivotally couple the first end portion 371 of the connecting rod 370 to the pivot links 356. Similarly, the second end fitting 374 can also be a clevis fitting having a pair of opposing lugs 588 with corresponding pin apertures 590. The pin apertures 590 are configured to receive the pivot pin 376 (FIG. 3B) and pivotally couple the second end portion 373 of the connecting rod 370 to the ramp lip 116.

In other embodiments, the connecting rod 370 can include other types of compressible structures and systems to provide a biasing force. For example, in some embodiments the connecting rod 370 or variations thereof can include pneumatic gas systems, such as sealed gas systems, to provide a biasing force, a compressive preload, and/or dampening. In other embodiments, it is expected that the connecting rod can include resilient rubber members and/or hydraulic systems to provide the desired biasing and/or dampening characteristics. In yet other embodiments, the biasing member 580 can be omitted, and the connecting rod can be a rigid, or at least a generally rigid and incompressible member. Accordingly, the present disclosure is not limited to spring-loaded connecting rods, but can utilize other types of connecting rods without departing from the spirit or scope of the present disclosure.

FIG. 6A is an isometric view of the articulating lift arm assembly 340, FIGS. 6B and 6C are enlarged side and front views respectively, of the lift arm assembly 340, and FIGS. 6D and 6E are enlarged front and side views, respectively, of the pivot pin 352 configured in accordance with embodiments of the disclosure. Referring first to FIGS. 6D and 6E together, the pivot pin 352 of the illustrated embodiment can be a step pin machined or otherwise formed from a suitable material, such as mild steel. The pin 352 can include first and second coaxial cylindrical end portions 682a, b extending outwardly from a larger diameter mid-portion 684. The mid-portion 684 can provide a shoulder for each end portion 682. Moreover, the mid-portion 684 can include a through-hole 686, such as a cylindrical through-hole. As explained in greater detail below, the through-hole 686 can be configured to receive a tie-rod or similar structure to facilitate attachment of the biasing members 346 (FIG. 3A).

Referring next to FIGS. 6A-6C together, in the illustrated embodiment coaxial apertures 650a, b extend through opposing side flanges at the second end portion 347 of the upper link 344. Coaxially apertures 640a, b also extend through opposing end brackets 658a, b positioned at the second end portion 343 of the lower link 342. As shown in FIG. 6C, in the illustrated embodiment each cylindrical end portion 682 of the pivot pin 352 extends through the corresponding coaxial apertures 650 and 640 to pivotally couple the upper link 344 to the lower link 342. As mentioned above, the through-hole 686 and/or other attachment features can be used to suitably attach the biasing members 346 to the articulating joint 353 between the lower link 342 and the upper link 344 as shown in, for example, FIG. 3A. In other embodiments, other types of pivot pins and/or similar structural members can be used to pivotally attach the upper link 344 to the lower link 342 including, for example, suitable bolts, shoulder bolts, etc. In addition, in other embodiments other other structural members and/or features can be used to operably couple the biasing members 346 to the lift assembly 340 in place of the pivot pin 352.

In another aspect of this embodiment, the first end portion 341 of the lower link 342 includes coaxial apertures 646 configured to receive a bolt or other suitable pivot pin to pivotally couple the lower link 342 to the aft pivot bracket 348 on the cross member 312 of the base frame 210 (FIG. 3A). Similarly, the first end portion 345 of the upper link 344 includes coaxial apertures 652 configured to receive a pivot pin to pivotally coupled the upper link 344 to the upper pivot bracket 350 on the underside of the ramp 112 (FIG. 3A). In the illustrated embodiment, the push bar pivot bracket 362 includes a pair of spaced apart lugs 654 welded or otherwise fixedly attached to a portion (e.g., a mid-portion) of the upper link 344. Each of the lugs 654 includes a corresponding aperture 656 configured to receive a suitable bolt or other pivot pin to pivotally attach the first end portion 368 of the push bar 360 (FIG. 4A) to the upper link 344.

Figure 7A:
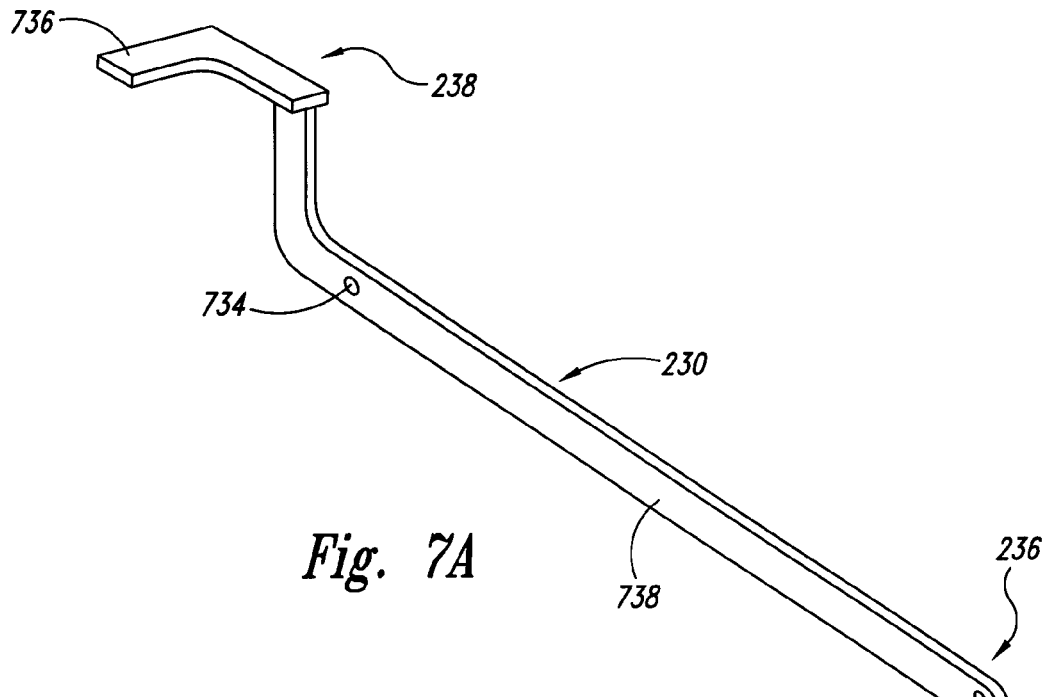
FIG. 7A is an isometric view of a trip arm for use with a dock leveler configured in accordance with an embodiment of the disclosure.
Figure 7B:
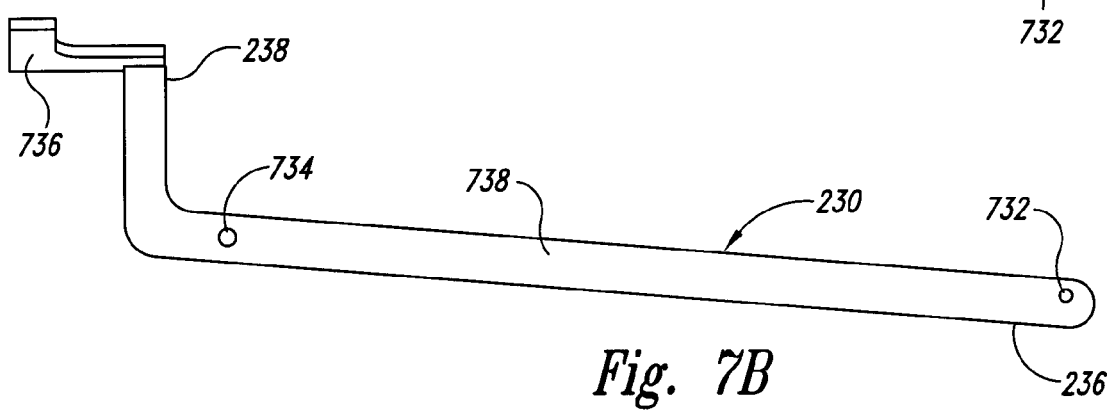
FIGS. 7B and 7C are enlarged side and end views, respectively, of the trip arm of FIG. 7A.
Figure 7C:
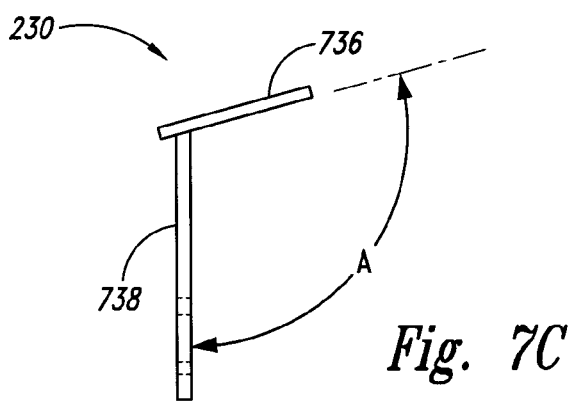

FIG. 7A is an isometric view of the trip arm 230 configured in accordance with an embodiment of the disclosure, and 7B and 7C are enlarged side and end views, respectively, of the trip arm 230. Referring to these views together, the second end portion 238 of the trip arm 230 includes a depressor portion 736. In the illustrated embodiment, the depressor portion is a generally "L" shaped flat member that is welded or otherwise fixedly attached to a body portion 738 at an angle A (FIG. 7C). The angle A can be from about 90 degrees to about 115 degrees, or about 105 degrees. As described in greater detail below, the depressor portion 736 provides a surface to push down on the second end 366 of the push bar 360 to disengage the pivot links 356 and connecting rod 370 from the over-center position shown in, for example, FIG. 3B and release the lip 116.

In another aspect of this embodiment, the trip arm 230 further includes a first aperture 732 positioned toward the first end portion 236 and a second aperture 734 positioned toward the second end portion 238. The first aperture 732 is configured to receive a suitable fastener for operably attaching the first pull chain 228a to the trip arm 230. The second aperture 734 is configured to receive a bolt or other suitable member to pivotally attach the trip arm 230 to a pivot bracket 232 (FIG. 2B) extending downwardly from one of the support beams 208 under the ramp 112. In the illustrated embodiment, the trip arm 230 can be comprised of generally flat members cut from, e.g., mild steel, and welded together. As those of ordinary skill in the art will appreciate, however, in other embodiments the trip arm 230 and variations thereof can be formed from other materials and/or in other suitable ways known in the art.

Figure 8A:
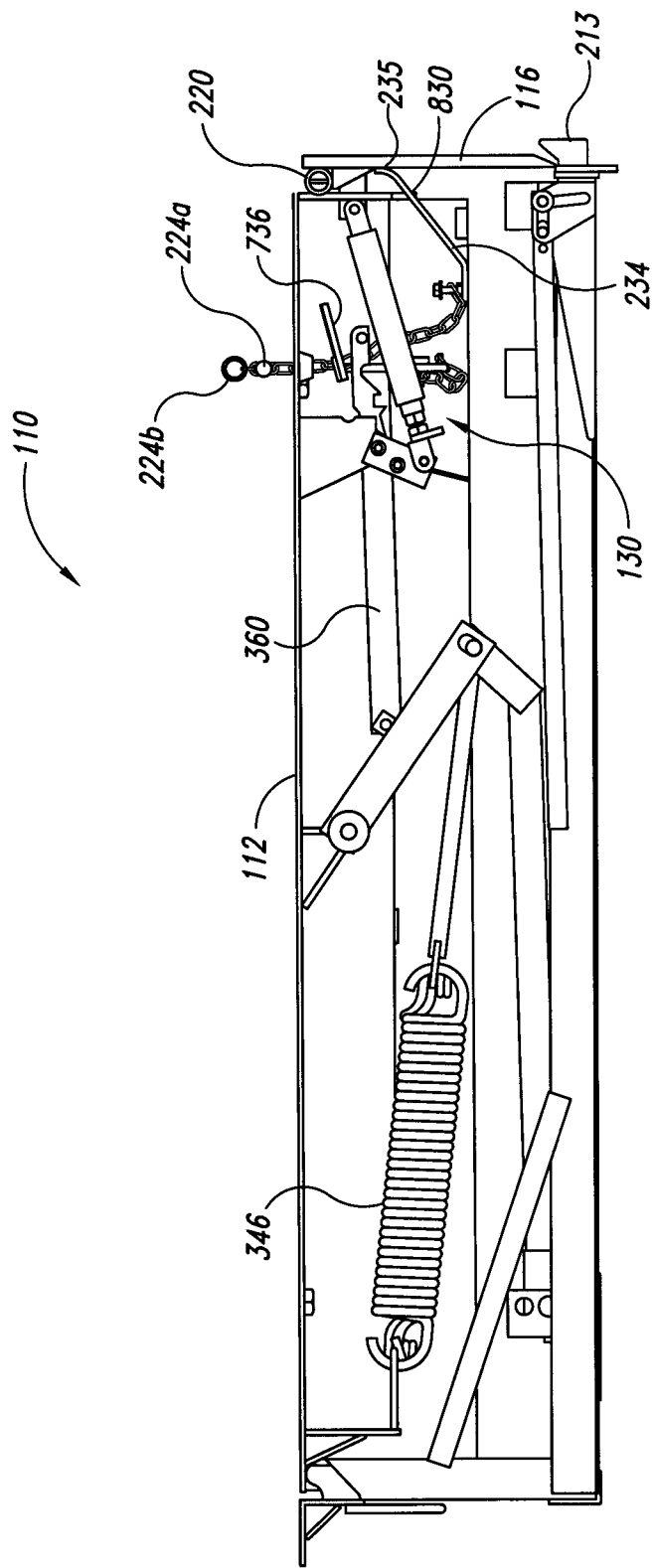
FIGS. 8A-8I are a series of side views illustrating various stages of operation of the dock leveler of FIGS. 1-3B in accordance with various embodiments of the present disclosure.

FIGS. 8A-8I are a series of side views illustrating various stages of operation of the dock leveler 110 in accordance with embodiments of the disclosure. Referring first to FIG. 8A, this figure illustrates the dock leveler 110 in a stored position with the lip lifting system 130 disengaged and the forward edge portion 221 of the lip 116 received in the keepers 213. Although the biasing members 346 provide an upward bias that counterbalances the downward bias of the ramp 112, the ramp 112 still has a net downward bias that keeps the ramp 112 in the position shown without the use of additional hold-down or locking devices. As shown in FIG. 8A, the push bar 360 is disengaged from the latch pin 358, and the distal end portions of the pivot links 356 hang below the brackets 354 (See FIG. 3B).

Figure 8B:
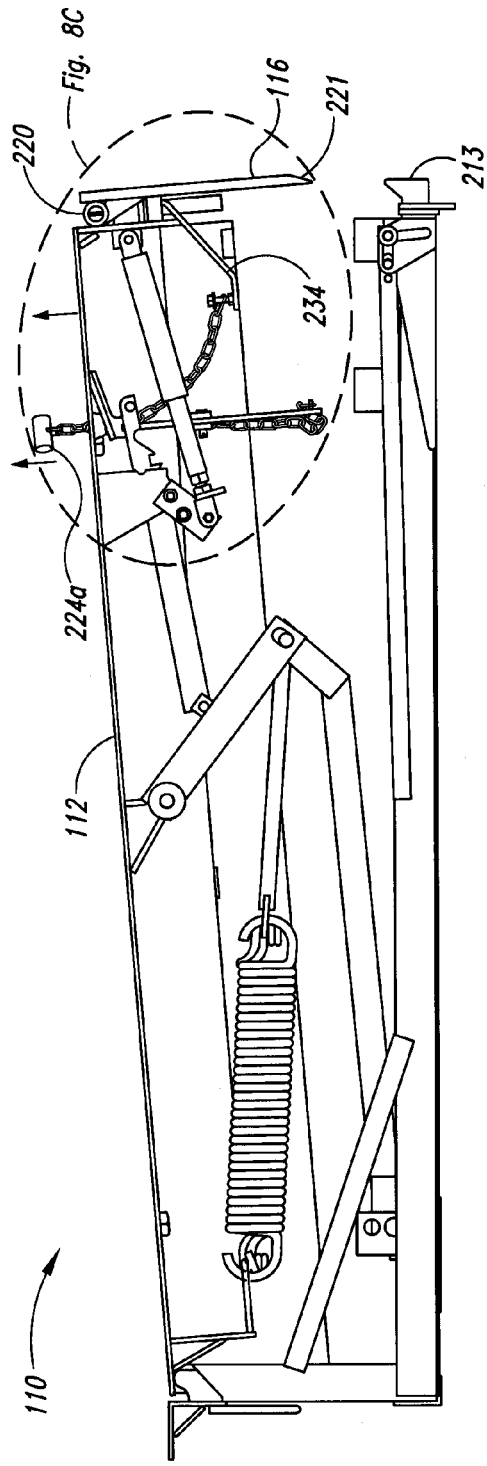
Figure 8C:
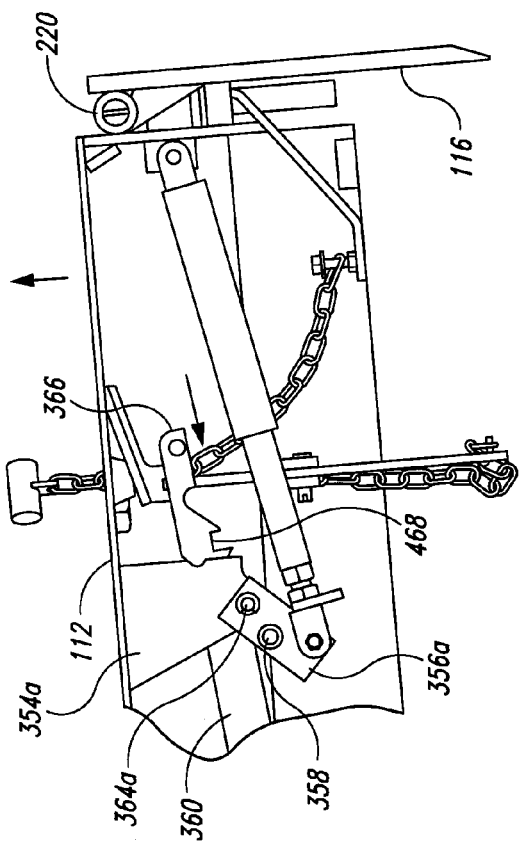

Referring next to FIGS. 8B and 8C together, to raise the ramp 112 and extend the lip 116 for use, an operator or user (not shown) reaches into the first cup 226a (FIG. 2B) and grasps the first handle 224a and pulls upwardly. This causes the trip arm 230 to rotate upwardly and bear against the undersides of the adjacent support beams 208 (FIG. 2B). Continued pulling on the first handle 224a causes the ramp 112 to rotate upwardly. As the ramp 112 moves upwardly, the lip 116 lifts out of the keepers 213 and hangs pendent from the hinge 220. In addition, as shown in FIG. 8C, the second end portion 366 of the push bar 360 begins moving rearward between the brackets 354.

Figure 8D:
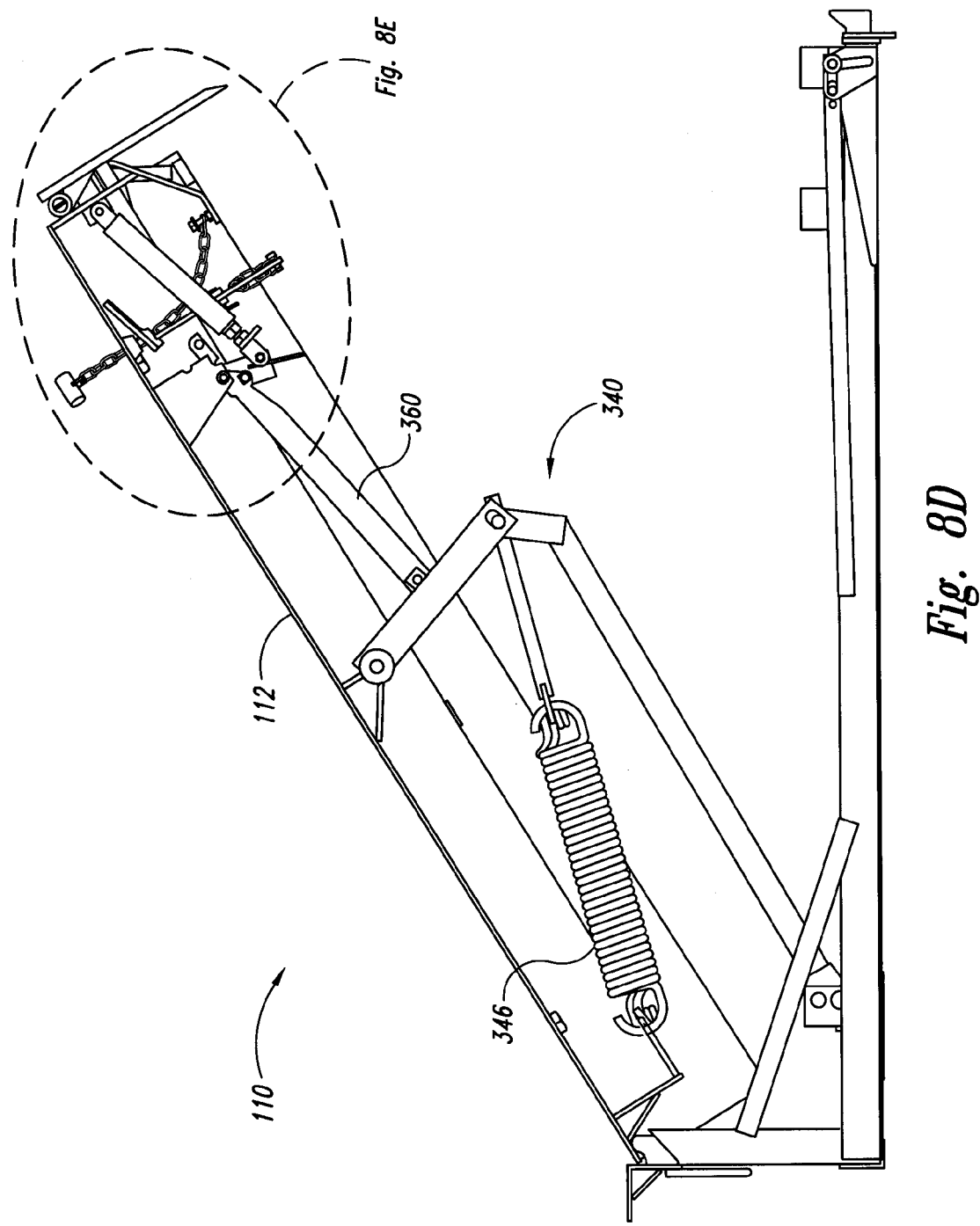
Figure 8E:
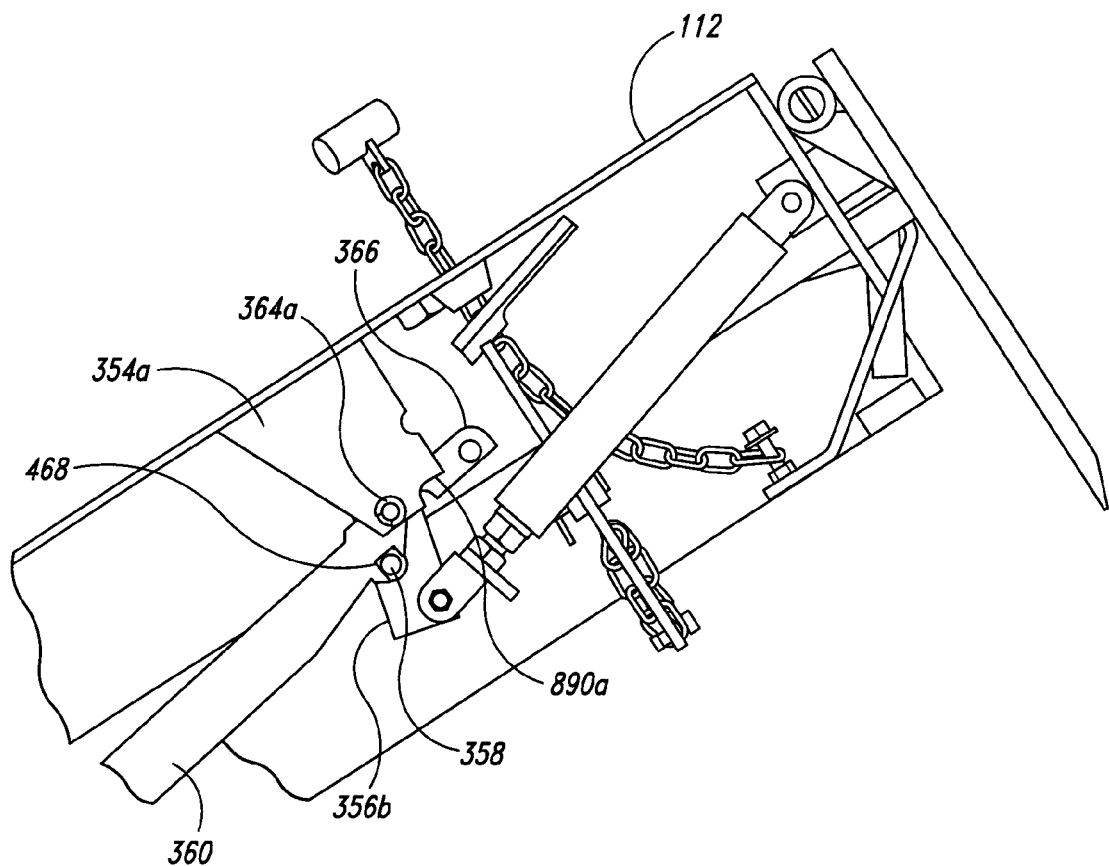
Figure 8F:
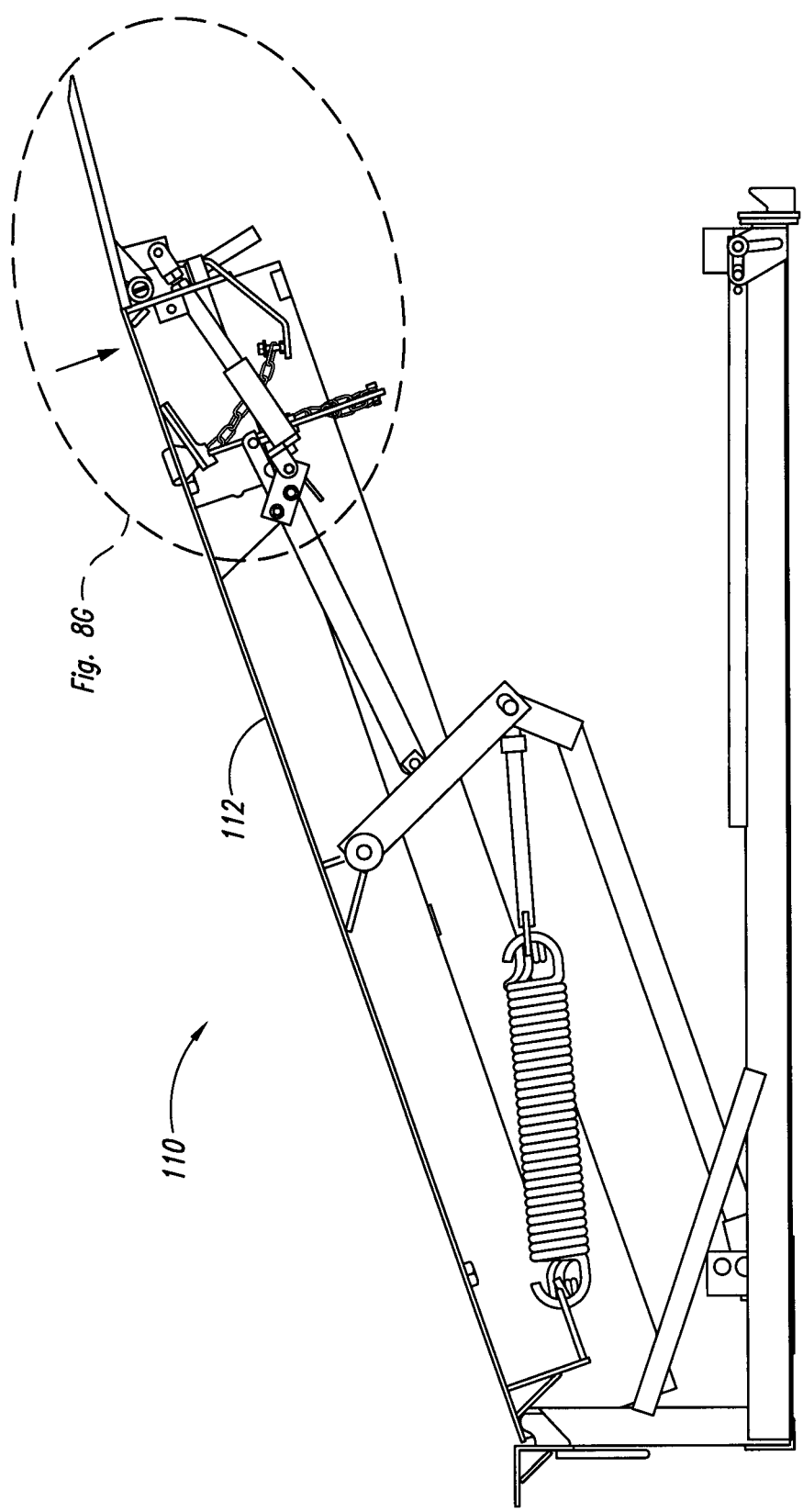
Figure 8G:
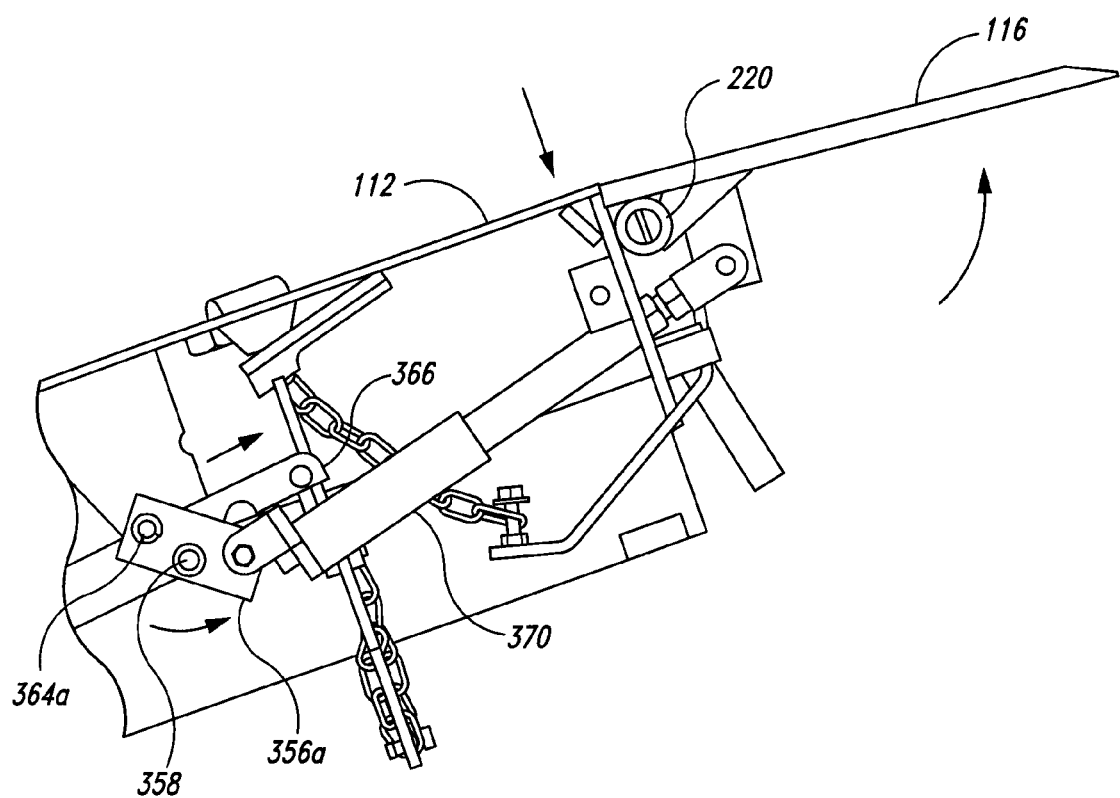

Referring next to FIGS. 8D and 8E, the biasing members 346 continue to counterbalance or offset the weight of the ramp 112 as the user continues to rotate the ramp 112 upwardly. However, the ramp 112 continues to have a net downward bias until the latch pin 358 is received in the notch 468 in the push bar 360, as shown in FIG. 8E (the first pivot link 356a has been removed from FIGS. 8D and 8E for purposes of clarity). Once the push bar 360 engages the latch pin 358, the user can stop lifting the first handle 224a. In that position, the push bar 360 forms an arrangement with the lift arm assembly 340 and the lip lifting system 130 that supports the ramp 112, and additional weight must be applied to the ramp 112 to lower the ramp and extend the lip. From this position, the user can begin walking down the ramp 112 (e.g., the user can begin walking from the aft edge portion 216 toward the forward edge portion 218) to move the ramp 112 toward the position shown in FIGS. 8F and 8G.

Figure 8H:
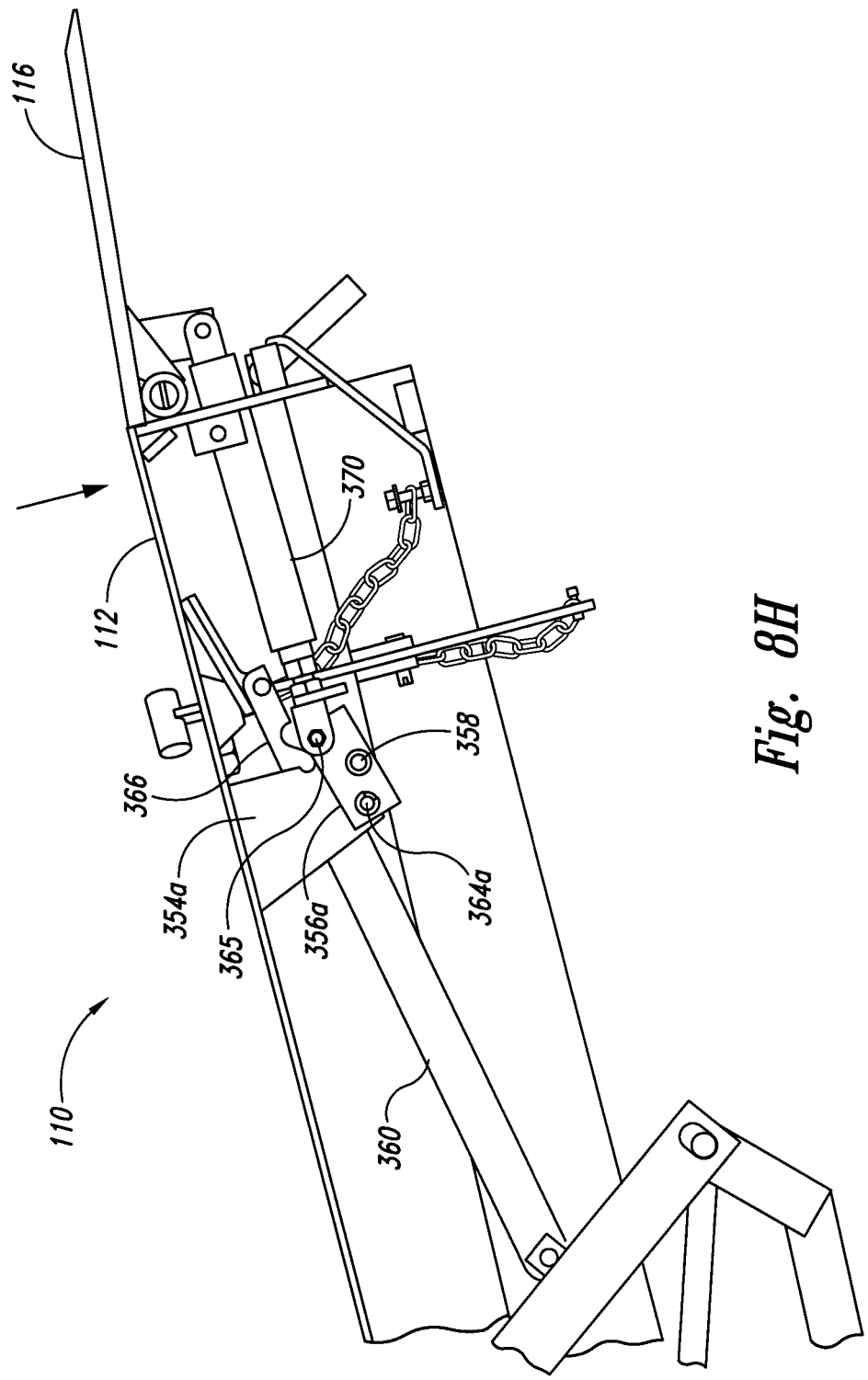

As the user walks down the ramp 112, the push bar 360 moves forward. Because the latch pin 358 is engaged with the notch 468, the push bar 360 drives the pivot links 356 forward. As the pivot links 356 rotate forward, they drive the connecting rod 370 forward and compress it against the lip 116. This pushes the lip 116 upward into the extended position and compresses the biasing member 580 in the connecting rod 370 (FIGS. 5A-5C) in the process. Continued forward rotation of the pivot links 356 causes the pivot links 356 to move into an "over-center" position or "locked" position, as shown in FIG. 8H. As the pivot links 356 move into this position, the pivot pin 365 strikes the angled surface 464 (FIG. 4B) and disengages the notch 468 from the latch pin 358. This permits the second end portion 366 of the push bar 360 to move forward through the gap between the brackets 354 as the ramp 112 continues to rotate downwardly. In addition, the latch pin 358 swings upwardly and is received in recesses 890a, b formed in the lower front edge portions of the brackets 354 (FIG. 8E). The weight from the lip 116 combined with the compression force from the biasing member 580 in the connecting rod 370 presses against the pivot links 356 and holds them in the over-center position shown in FIG. 8H. As described in greater detail below, a torsion spring (not shown in FIG. 8H) can be operably coupled to, for example, the pivot pin 365 to exert a torsional force between the pivot links 356 and the connecting rod 370 that tends to bias the pivot links 356 toward the over-center position shown in FIG. 8H. As described in greater detail below, this torsion spring and the compressive preload in the connecting rod 370 can reduce the likelihood that the lip 116 is inadvertently disengaged and allowed to fall pendent during use.

When the push bar 360 disengages from the latch pin 358, the ramp support provided by the push bar 360 is removed. The repositioning of the lip 116 from the pendent to the extended position provides additional downward bias for the ramp 112 and lip assembly. As a result, the ramp 112 assumes a more downward bias and can descend from the position shown in FIG. 8H under its own weight.

Figure 8I:
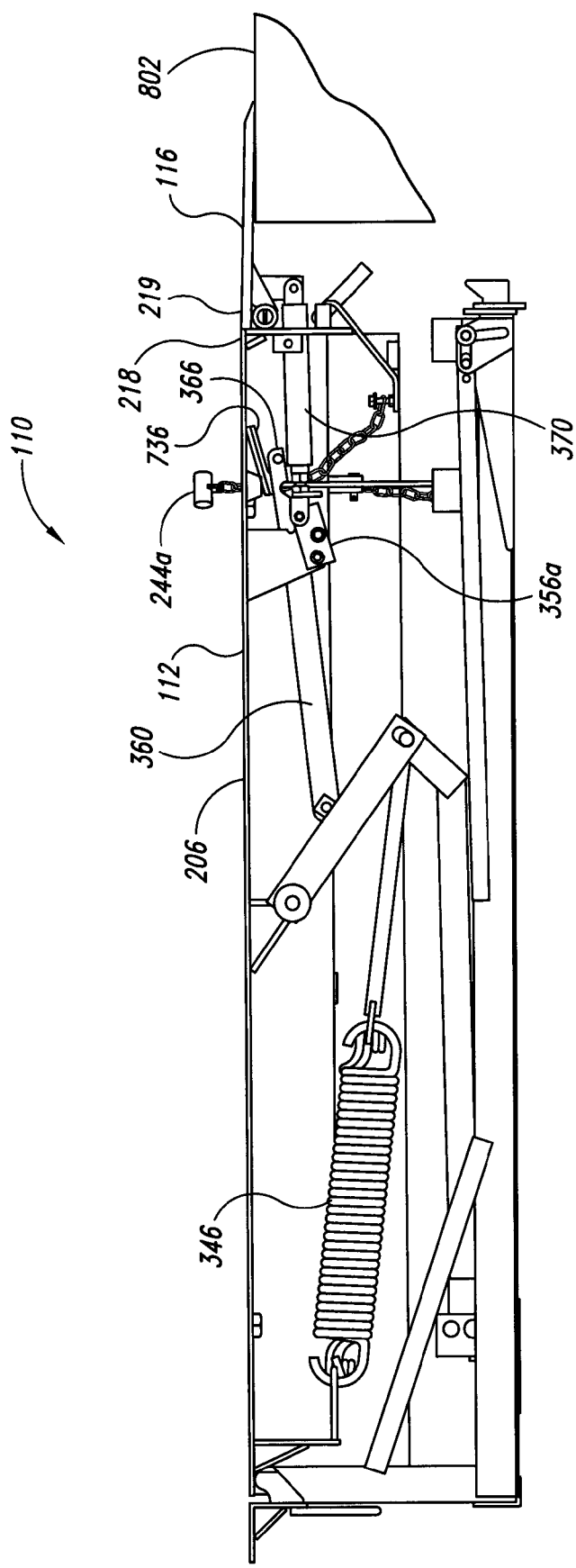

Referring next to FIG. 8I, as the ramp 112 continues to rotate downwardly, the extended lip 116 comes to rest on a bed 802 of a trailer or other cargo vehicle positioned in front of the loading dock opening. The compressive preload in the connecting rod 370, alone or in combination with the torsion spring discussed above which tends to bias the pivot links 356 toward the over-center position, holds the pivot links 356 in the over-center position when the ramp 112 is in use. One advantage of this arrangement is that the force exerted on the lip 116 by the preload in the connecting rod 370 presses the aft edge portion 219 of the lip 116 against the forward edge portion 218 of the deck 206 and alleviates, or at least reduces, the gap between these two edged portions. Moreover, if the ramp 112 bounces up and down during operation, the preload in the connecting rod 370 tends to press the aft edge portion 219 of the lip 116 against the forward edge portion 218 of the deck 206 and prevent of the lip 116 from banging against the deck 206. By eliminating this constant impact, the spring-loaded connecting rod 370 can reduce wear on the lip hinges 220 and associated hardware. Moreover, the preload in the connecting rod 370 can prevent the pivot links 356 from rotating downwardly and inadvertently disengaging the lip lifting mechanism 130.

Although the various features, movements, and biasing forces associated with operation of the dock leveler 110 have been described above with reference to the illustrated embodiments, in other embodiments, dock levelers configured in accordance with the present disclosure can include other features, movements, and biasing forces and can operate in different manners. For example, in other embodiments dock levelers configured in accordance with the present disclosure can have more or less of a downward bias after the push bar engages the lip lifting system. Accordingly, the present disclosure is not limited to the particular embodiments illustrated, but extends to other embodiments of systems and methods disclosed herein.

Figure 9:
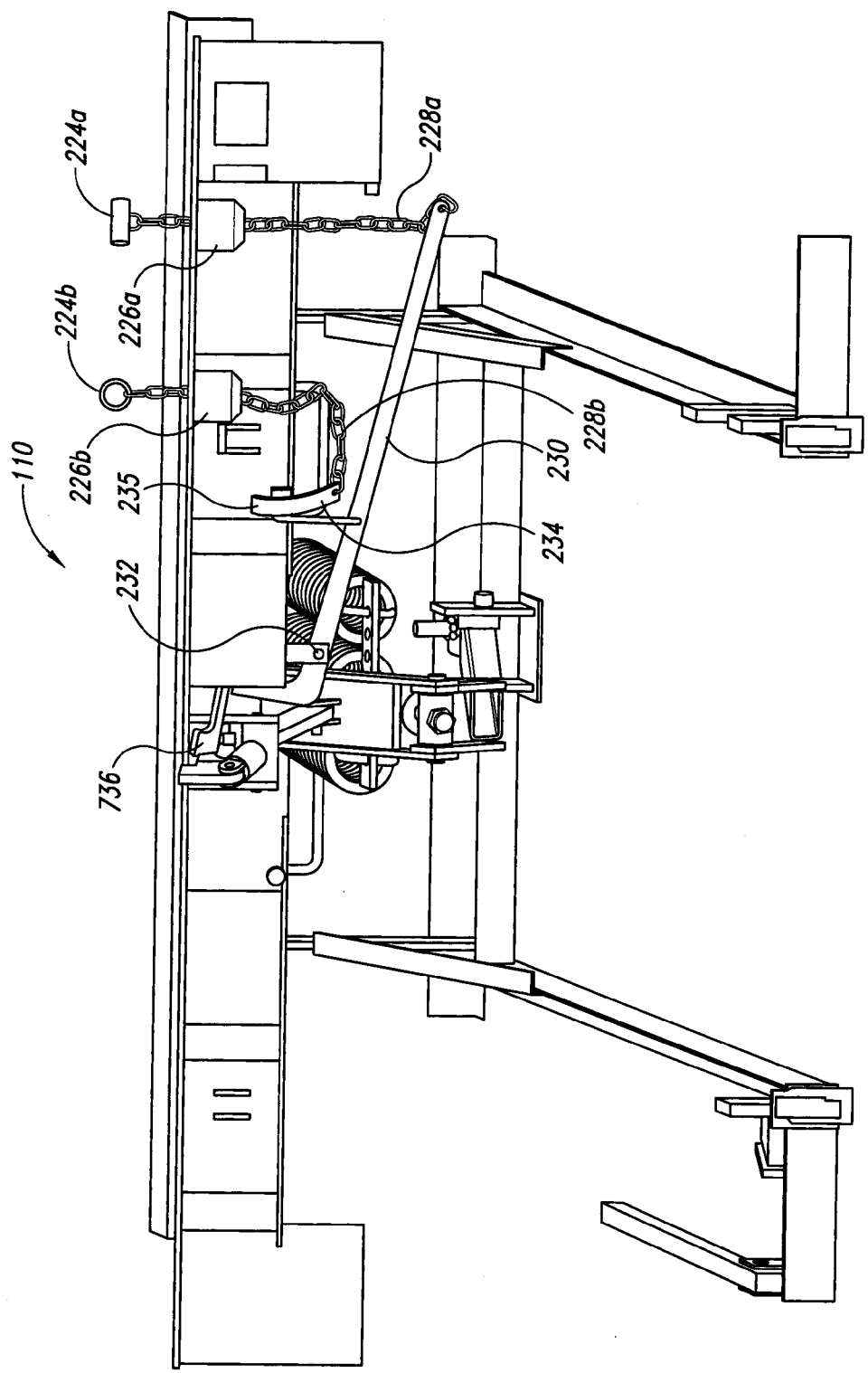
FIG. 9 is an isometric front view of the dock leveler of FIGS. 1-3B illustrating various aspects of the trip arm of FIGS. 7A-7C and a lip extension arm configured in accordance with an embodiment of the disclosure.
Figure 10:
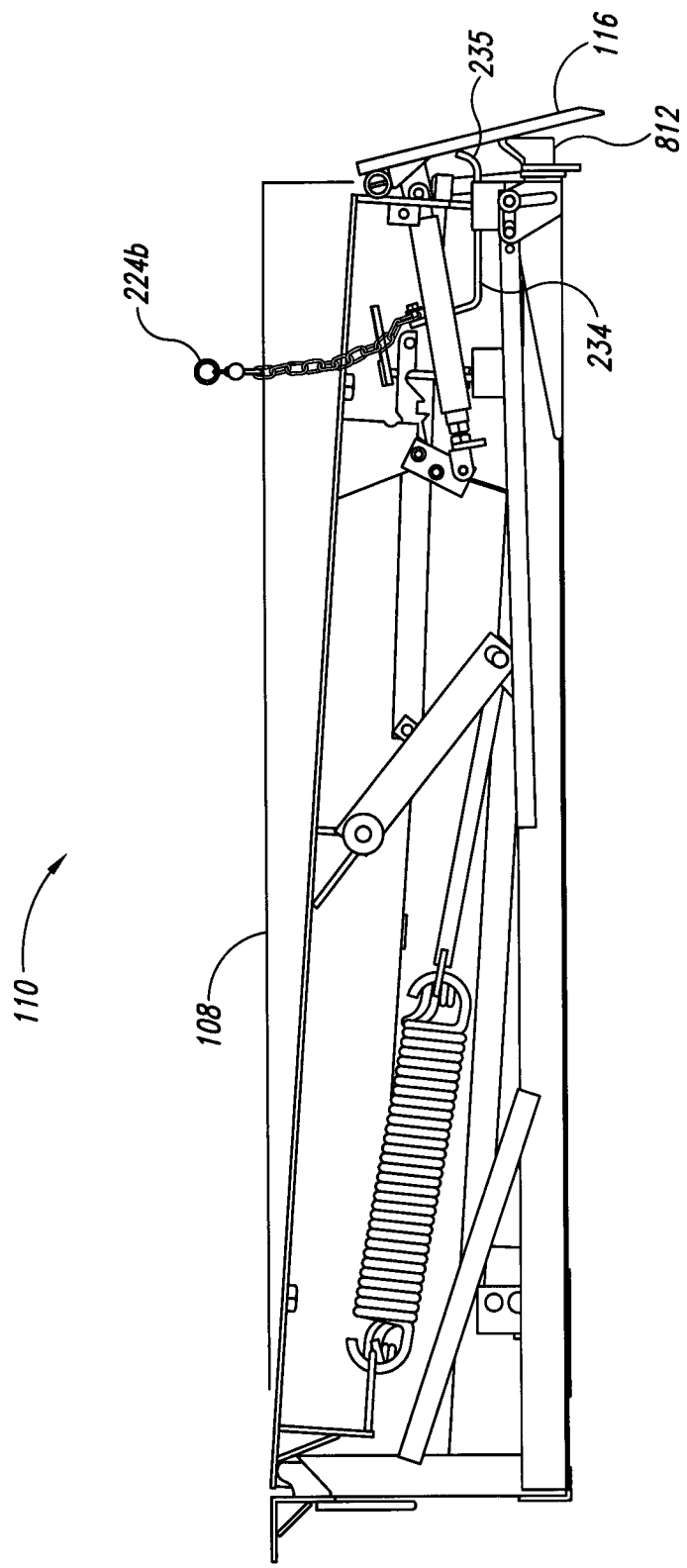
FIG. 10 is a partially cutaway side view of the dock leveler of FIGS. 1-3B illustrating the dock leveler in a below dock position in accordance with an embodiment of the disclosure.

FIG. 9 is a front isometric view of the dock leveler 110 illustrating various aspects of the trip arm 230 and the lip extension arm 234. FIG. 10 is a partially cutaway side view of the dock leveler 110 in a "full below dock" configuration. Referring to FIGS. 8A, 9 and 10 together, to move the ramp 112 from the stored position shown in FIG. 8A to the below dock configuration, the user pulls upwardly on the second lift handle 224b. This causes the lip extension arm 234 to rotate in a clockwise direction (when viewed from the perspective of FIG. 8A) about a pivot bracket 830 that pivotally attaches the lip extension arm 234 to the header plate 314. As the lip extension arm 234 rotates, a forward end portion 235 of the lip extension arm 234 presses against the underside of the lip 116 and pushes the lip outwardly about the hinge 220. The upward force exerted on the second lift handle 224b also causes the ramp 112 to lift upwardly, allowing the lip 116 to rotate out of the keepers 213. The user can then reduce the lifting force on the second lift handle 224b so that the weight of the ramp 112 causes the ramp 112 to rotate downwardly into the below dock position shown in FIG. 10 in which the lip 116 is positioned outboard of the lip keepers 213. The user can then release the second lift handle 224 and the weight of the ramp 112 will keep the ramp 112 in the below dock position shown.

Although the embodiment of the dock leveler 110 described above utilizes lip keepers, in other embodiments the lip keepers 213 can be omitted. For example, in some embodiments the dock leveler 110 and variations thereof can use other structures, such as movable support legs, to support the ramp 112 in the stored position. Accordingly, the present disclosure is not limited to dock levelers that include lip keepers.

To move the ramp 112 from the below dock position shown in FIG. 10, the user can lift upwardly on the first handle 224a (FIGS. 9 and 8A) as described above. This will rotate the dock ramp 112 upwardly and allow the lip 116 to fall pendent from the hinges 220. The user can then lower the dock ramp 112 downwardly so that the forward edge portion 221 of the lip 116 comes to rest in the keepers 213 as shown FIG. 8A.

Returning to FIG. 8I, to retract the lip 116 from the trailer bed 802 and store the ramp 112, the user can again lift upwardly on the first handle 224a. Doing so causes the chain 228a (FIG. 9) to rotate the trip bar 230 upwardly until it bears against the underside of the beams 208 extending longitudinally under the deck 206, at which point further lifting of the first handle 224a causes the ramp 112 to start rotating upwardly. In addition, moving the trip bar 230 in this manner causes the depressor portion 736 of the trip bar 230 to move downwardly and press the second end portion 366 of the push bar 360 against the top rear portion of the connecting rod 370. This forces the first end portion 371 of the connecting rod 370 downward, causing the pivot links 356 to rotate downwardly and away from the over-center position shown in FIG. 8I, ultimately allowing the pivot links 356 to hang downward as shown in, for example, FIGS. 8B and 8C. If the lip 116 is still partially supported by the trailer bed 802, releasing the connecting rod 370 in this manner allows the biasing members 346 to slowly extend the lift arm assembly 340 causing the ramp 112 to rotate upwardly in a "self store" mode. The ramp 112 moves upwardly because the reduction in weight of the lip 116 by virtue of the support from the trailer bed 802 is enough to allow the biasing members 346 to lift the ramp 112 upwardly. Ultimately, however, the lip 116 will swing pendent and free of the trailer bed 802 as shown, for example, FIG. 8B, at which time the full weight of the lip 116 will cause the ramp 112 to descend downwardly (e.g., in a downward bias) until the forward edge portion 221 of the lip 116 comes to rest in the keepers 213 as shown in FIG. 8A.

Figure 11:
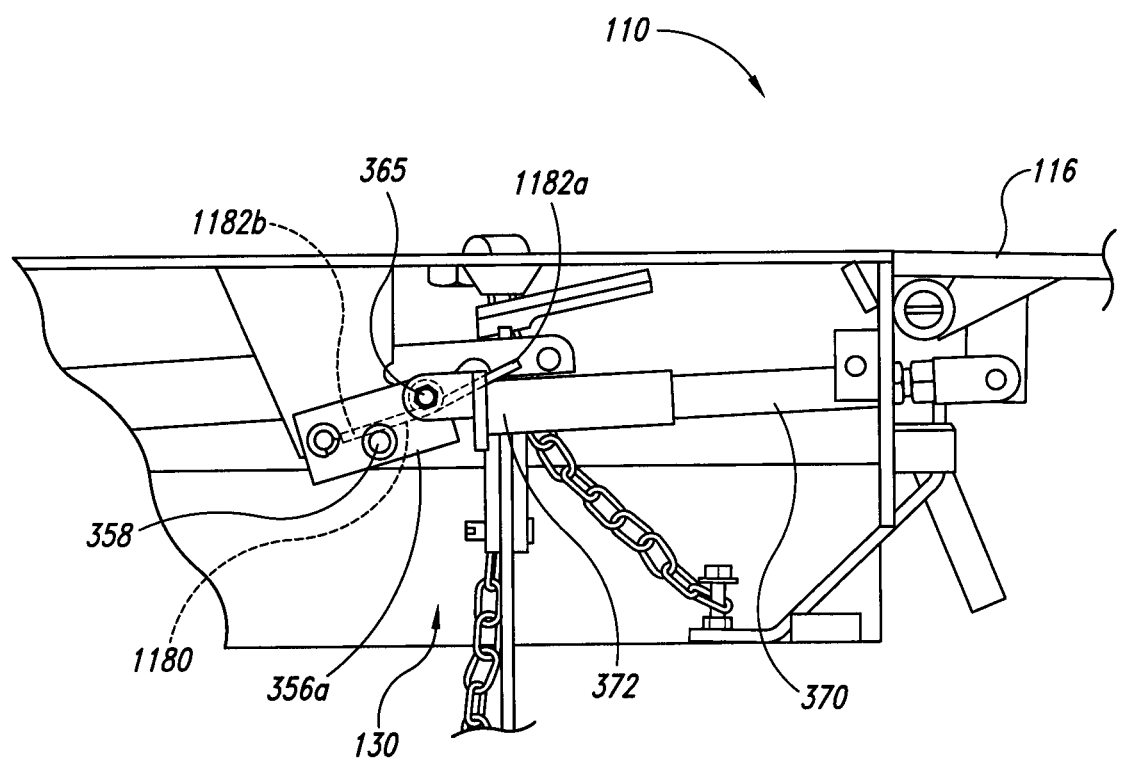
FIG. 11 is an enlarged side view of a portion of the dock leveler of FIGS. 1-3B illustrating additional aspects of the lip lifting system configured in accordance with an embodiment of the disclosure.

FIG. 11 is an enlarged side view of a portion of the dock leveler 110 illustrating various aspects of the lip lifting system 130 in accordance with an embodiment of the disclosure. In one aspect of this embodiment, a torsion spring 1180 (shown in hidden line) having a first end portion 1182a and a second end portion 1182b is operably disposed about the pivot pin 365 between the spaced-apart pivot links 356a, b. In this embodiment, the first spring end portion 1182a is operably coupled to the first end portion 371 of the connecting rod 370, and the second spring end portion 1182b is operably coupled to the latch pin 358. Moreover, the torsion spring 1180 is preloaded during installation such that the first end portion 1182a exerts a generally downward force against the connecting rod 370, and the second end portion 1182b exerts a generally downward force against the latch pin 358 (when viewed from the perspective of FIG. 11) such that the preload tends to drive the pivot links 356 upwardly and into the over center position illustrated in FIG. 11. The preload in the torsion spring 1180 can assist the preload in the connecting rod 370 to keep the pivot links 356 in the over-center position and the lip 116 extended.

There are a number of benefits and advantages associated with various embodiments of the dock leveler systems described above. For example, one benefit of attaching the push bar 360 to the upper link 344 of the lift arm assembly 340 is that it results in a shorter, less expensive push bar. Moreover, attaching the push bar 360 to the upper link 344 avoids having to provide a rear frame structure of sufficient strength to react the lip lifting loads from the push bar 360. In addition, by using the motion of the lift arm assembly 340 to facilitate movement of the push bar 360, the pivot links 356 move through a greater angular range than if the push bar 360 was instead secured to a stationary portion of the rear support structure of the dock leveler. This additional angular range allows the connecting rod 370 to be preloaded with a compression force that exerts an outward force against the lip 116 once the lip 116 moves into the extended position. In addition, as explained above, the preload in the connecting rod 370 also causes the aft edge portion 219 of the lip 116 to maintain contact with the forward edge portion 218 of the deck 206, thereby minimizing deck bounce and improving the life of the lip hinge assembly 220 and associated hardware by preventing or at least reducing shock loads on the lip hinge assembly 220 during use. The preload in the connecting rod 370 also maintains pressure on the pivot links 356 and the lip 116 which helps to keep the pivot links 356 from falling out of the over-center position when the lip 116 lands on the bed of a truck or trailer. Conversely, if the push bar 360 were instead attached to a stationary point on a rear portion of the dock leveler support structure, there may not be sufficient rotation of the pivot links 356 to maintain sufficient preload in the connecting rod 370.

As discussed above, attaching the push bar 360 to the lift arm assembly 340 also provides a variable counterbalance system that behaves differently depending on the ramp position and other factors. For example, when the ramp 112 is in the stored position, the push bar 360 is disengaged from the lip lifting system 130 and, as a result, the push bar 360 does not support the ramp 112. However, when the ramp 112 is raised to the point where the push bar 360 is engaged with the latch pin 358, the added weight from the lip 116 drives the push bar 360 against the lift arm assembly 340, thereby supporting at least a portion of the weight of the ramp 112. As a result, when the dock leveler 110 is lifted and the push bar 360 is engaged, the ramp 112 will not drop, or will at least drop relatively slowly, under its own weight. Conversely, if the push bar 360 were instead attached to a rear support frame, the added force from the extended lip 116 would not push against the lift arm assembly 340 and at least partially support the weight of the ramp 112. A further advantage of the upward bias provided by coupling the push bar 360 to the lift arm assembly 340 is that this allows extra weight to be added to the dock leveler (for example, for additional toe guards, etc.) without it becoming too heavy to operate. In another aspect of some of the embodiments described above, the lift handle 224a requires less force to release the lip 116 than to lift the dock leveler ramp 112. One benefit of this arrangement is that the lip 116 can be released and allowed to hang pendent, without the user having to lift the dock ramp 112.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A dock leveler comprising:
   a ramp having an aft deck portion and a forward deck portion;
   a lip pivotally attached toward the forward deck portion;
   a ramp lifting system configured to facilitate upward rotation of the ramp about an aft hinge, wherein the ramp lifting system includes an articulating arm having a first link pivotally coupled to a second link, wherein the first link includes a first end portion operably coupled to a dock leveler support structure and the second link includes a second end portion operably coupled to the ramp; and
   a lip lifting system that includes
      a connecting rod having a third end portion operably coupled to the lip and a fourth end portion operably coupled to a pivot link supported by the ramp; and
      a push bar having a fifth end portion operably coupled to the second link of the articulating arm and a sixth end portion configured to operably engage the pivot link and drive it to an over-center position as the second link drives the push bar, thereby extending the lip as the ramp rotates downwardly about the aft hinge.

2. The dock leveler of claim 1 wherein the ramp lifting system includes a counterbalance system configured to assist manual raising of the ramp.

3. The dock leveler of claim
   wherein the ramp lifting system includes:
   one or more biasing members operably coupled to the articulating arm and urging the first end portion away from the second end portion.

4. The dock leveler of claim 1 wherein the connecting rod is a compressible connecting rod.

5. A dock leveler comprising:
   a support structure configured to be fixedly mounted to a loading dock;
   a ramp having an aft edge portion and a forward edge portion, wherein the aft edge portion is pivotally attached to the support structure;
   a counterbalance system operably coupled between the support structure and the ramp, wherein the counterbalance system includes a first pivot link that exerts an upward biasing force against the ramp to offset the weight of the ramp;
   a lip pivotally attached toward the forward edge portion of the ramp; and
   a lip lifting system having
      at least a second pivot link having a proximal end portion supported by the ramp;
      a connecting rod having a first end portion operably coupled to the lip and a second end portion operably coupled to a distal end portion of the second pivot link; and
      a push bar having a third end portion pivotally coupled to the first pivot link and a fourth end portion configured to operably engage the second pivot link as the ramp rotates downwardly and drive the second end portion of the connecting rod toward the forward edge portion of the ramp, thereby rotating the lip outwardly from the forward edge portion of the ramp as the ramp rotates downwardly about the aft edge portion.

6. The dock leveler of claim 5 wherein the first pivot link rotates toward the forward edge portion of the ramp as the ramp descends.

7. The dock leveler of claim 5 wherein the first pivot link is an upper link, and wherein the counterbalance system further includes a lift arm assembly that includes the upper link operably coupled to the ramp and a lower link operably coupled to the support structure.

8. The dock leveler of claim 5 wherein the first pivot link is an upper link having a fifth end portion spaced apart from a sixth end portion, wherein the fifth end portion is pivotally attached to the ramp, and wherein the counterbalance system further includes:
   a lower link having a seventh end portion spaced apart from an eighth end portion, wherein the seventh end portion is pivotally attached to the support structure, and wherein the eighth end portion is pivotally coupled to the sixth end portion of the upper link; and
   a biasing member operably coupled to at least one of the upper and lower link and urging the fifth end portion of the upper link away from the seventh end portion of the lower link.

9. The dock leveler of claim 5 wherein the first pivot link is an upper link, and wherein the counterbalance system includes:
   an articulating arm having the upper link pivotally coupled to a lower link at an articulating joint, wherein the upper link has a first end portion pivotally attached to the ramp and the lower link has a second end portion pivotally attached to the support structure; and one or more biasing members positioned in tension between the articulating joint and the support structure, to thereby exert an upward force on the ramp via the articulating arm that offsets the weight of the ramp.

10. The dock leveler of claim 5 wherein the lip lifting system further comprises a compressible member configured to be operably coupled between the lip and the push bar.

11. The dock leveler of claim 5 wherein the connecting rod includes a biasing member operably coupled between the first and second end portions, wherein the first end portion is movable relative to the second end portion, and wherein the biasing member urges the first end portion away from the second end portion.

12. The dock leveler of claim 5 wherein the connecting rod includes a coil spring compressed between the first and second end portions, wherein the first end portion is movable relative to the second end portion, and wherein the coil spring urges the first end portion away from the second end portion.

13. The dock leveler of claim 5 wherein the connecting rod includes:
   a first tube fixedly attached to the first end portion; and
   a second tube fixedly attached to the second end portion, wherein the first tube is concentrically received by the second tube whereby the first end portion can move axially relative to the second end portion.

14. A dock leveler comprising:
   a support structure configured to be fixedly mounted to a loading dock;
   a ramp having an aft edge portion and a forward edge portion, wherein the aft edge portion is pivotally attached to the support structure;
   a counterbalance system operably coupled between the support structure and the ramp, wherein the counterbalance system exerts an upward biasing force against the ramp to offset the weight of the ramp, and wherein the counterbalance system includes:
      an upper link having a first end portion spaced apart from a second end portion, wherein the first end portion is pivotally attached to the ramp;
      a lower link having a third end portion spaced apart from a fourth end portion, wherein the third end portion is pivotally attached to the support structure, and wherein the fourth end portion is pivotally coupled to the second end portion of the upper link; and
      a biasing member operably coupled to at least one of the upper and lower link and urging the first end portion of the upper link away from the third end portion of the lower link;
   a lip pivotally attached toward the forward edge portion of the ramp; and
   a lip lifting system having:
      a connecting rod having a fourth end portion operably coupled to the lip and a fifth end portion operably coupled to a pivot link supported by the ramp, and
      a push bar operably coupled to the upper link between the first and second end portions, wherein the push bar has a sixth end portion, and wherein the lip lifting system cooperates with the counterbalance system to operably engage the sixth end portion with the pivot link and drive it to an over-center position, thereby rotating the lip outwardly from the forward edge portion of the ramp as the ramp rotates downwardly about the aft edge portion.

15. A dock leveler comprising:
   a support structure configured to be fixedly mounted to a loading dock;
   a ramp having an aft edge portion and a forward edge portion, wherein the aft edge portion is pivotally attached to the support structure;
   a counterbalance system operably coupled between the support structure and the ramp, wherein the counterbalance system exerts an upward biasing force against the ramp to offset the weight of the ramp, and wherein the counterbalance system includes a lift arm assembly having an upper link operably coupled to the ramp and a lower link operably coupled to the support structure;
   a lip pivotally attached toward the forward edge portion of the ramp; and
   a lip lifting system, wherein the lip lifting system includes:
      a first pivot link spaced apart from a second pivot link, wherein each pivot link includes a proximal end portion and a distal end portion, wherein the proximal end portions are pivotally supported by the ramp;
      a latch pin carried by the first and second pivot links between the proximal and distal end portions;
      a connecting rod having a first end portion operably coupled to the lip and a second end portion operably coupled to the distal end portions of the first and second pivot links; and
      a push bar having a third end portion operably coupled to the upper link of the counterbalance system and a fourth end portion configured to operably engage the latch pin as the ramp rotates downwardly and drive the connecting rod toward the forward edge portion of the ramp, thereby rotating the lip outwardly from the forward edge portion of the ramp as the ramp rotates downwardly about the aft edge portion.

16. A method of operating a dock leveler having a ramp and a lip, the method comprising:
   manually raising the ramp from a lower position to an upper position, wherein the ramp has a downward bias during the raising; and
   reducing the downward bias at the upper position by operably engaging a lip lifting mechanism between the lip and a counterbalance system, wherein the counterbalance system assists upward rotation of the ramp by means of an articulating arm having a first link pivotally coupled to a second link, wherein the first link includes a first end portion operably coupled to a dock leveler support structure and the second link includes a second end portion operably coupled to the ramp, and wherein the lip lifting system includes a connecting rod and a push bar, the connecting rod having a third end portion operably coupled to the lip and a fourth end portion operably coupled to a pivot link supported by the ramp, the push bar having a fifth end portion pivotally coupled to the second link of the articulating arm, wherein the second link drives the push bar to rotate the lip outwardly from the ramp as the ramp rotates downwardly.

17. The method of claim 16, further comprising walking down the ramp to lower the ramp from the upper position to the lower position and extend the lip outwardly from the ramp.

* * * * *

UNITED STATES PATENT AND TRADEMARK OFFICE
CERTIFICATE OF CORRECTION

| | | |
|---|---|---|
| PATENT NO. | : 8,407,842 B2 | Page 1 of 1 |
| APPLICATION NO. | : 12/862638 | |
| DATED | : April 2, 2013 | |
| INVENTOR(S) | : Michael Story et al. | |

It is certified that error appears in the above-identified patent and that said Letters Patent is hereby corrected as shown below:

In the Specification

In column 1, lines 39-41, below "reference." delete "To load or unload goods from a trailer, the doors on the aft end of the trailer are opened and the trailer is backed up to the loading dock opening. The loading dock".

In column 8, line 67, after "embodiments other" delete "other".

In the Claims

In column 14, line 4, in claim 3, delete "claim" and insert -- claim 1 --, therefor.

Signed and Sealed this
Thirtieth Day of July, 2013

Teresa Stanek Rea
*Acting Director of the United States Patent and Trademark Office*